(12) United States Patent  (10) Patent No.: US 7,949,213 B2
Mienko et al.                (45) Date of Patent:      May 24, 2011

(54) LIGHT ILLUMINATION OF DISPLAYS WITH FRONT LIGHT GUIDE AND COUPLING ELEMENTS

(75) Inventors: Marek Mienko, San Jose, CA (US); Gang Xu, Cupertino, CA (US); Ion Bita, San Jose, CA (US); Russell Wayne Gruhlke, Milpitas, CA (US); Alberto Emerico Brewer, Chula Vista, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 0 days.

(21) Appl. No.: 11/952,872

(22) Filed: Dec. 7, 2007

(65) Prior Publication Data

US 2009/0147535 A1    Jun. 11, 2009

(51) Int. Cl.
   *G02B 6/26*  (2006.01)
   *G02B 6/42*  (2006.01)
(52) U.S. Cl. ......... 385/31; 362/600; 362/602; 362/603; 362/607; 362/617; 362/330; 362/560; 362/561; 362/97.1; 362/97.2; 362/97.3; 385/129; 385/131
(58) Field of Classification Search .......... 362/600–603, 362/607, 612, 613, 616, 617, 623, 555, 511, 362/330, 560, 561, 97.2, 97.3
   See application file for complete search history.

(56) References Cited

U.S. PATENT DOCUMENTS

| 3,439,973 | A | 4/1969 | Paul et al. |
|---|---|---|---|
| 3,886,310 | A | 5/1975 | Guldberg |
| 3,924,929 | A | 12/1975 | Holmen |
| 4,228,437 | A | 10/1980 | Shelton |
| 4,378,567 | A | 3/1983 | Mir |
| 4,421,381 | A | 12/1983 | Ueda |
| 4,441,791 | A | 4/1984 | Hornbeck |
| 4,918,577 | A | 4/1990 | Furudate |
| 5,110,370 | A | 5/1992 | Vogeli et al. |
| 5,142,414 | A | 8/1992 | Koehler |

(Continued)

FOREIGN PATENT DOCUMENTS

CN    1381752    11/2002

(Continued)

OTHER PUBLICATIONS

International Search Report and Written Opinion in PCT/US2008/085010 dated Mar. 4, 2009.

(Continued)

*Primary Examiner* — Uyen-Chau N Le
*Assistant Examiner* — Chad H Smith
(74) *Attorney, Agent, or Firm* — Knobbe, Martens, Olson & Bear LLP

(57) ABSTRACT

In various embodiments described herein, a display device includes a front illumination apparatus that comprises a first light guide disposed forward of an array of display elements, such as an array of interferometric modulators, to distribute light across the array of display elements. The light guide panel is edge illuminated by a light source positioned behind the array display elements. The light from such a light source is coupled to a second light guide disposed behind the array of display elements and positioned laterally with respect to the light source. The light in the second light guide is coupled into the first light guide using a small optical coupling element such as a turning mirror. In some embodiments the second light guide may comprise the backplate of the display device.

34 Claims, 15 Drawing Sheets

U.S. PATENT DOCUMENTS

| | | | |
|---|---|---|---|
| 5,226,099 | A | 7/1993 | Mignardi et al. |
| 5,261,970 | A | 11/1993 | Landis et al. |
| 5,291,314 | A | 3/1994 | Agranat |
| 5,339,179 | A | 8/1994 | Rudisill |
| 5,452,385 | A | 9/1995 | Izumi |
| 5,481,385 | A | 1/1996 | Zimmerman et al. |
| 5,550,373 | A | 8/1996 | Cole |
| 5,579,149 | A | 11/1996 | Moret |
| 5,615,024 | A | 3/1997 | May et al. |
| 5,647,036 | A | 7/1997 | Deacon |
| 5,671,994 | A | 9/1997 | Tai |
| 5,673,128 | A | 9/1997 | Ohta et al. |
| 5,712,694 | A | 1/1998 | Taira et al. |
| 5,771,321 | A | 6/1998 | Stern |
| 5,808,708 | A * | 9/1998 | Oyama et al. ................ 349/65 |
| 5,883,684 | A | 3/1999 | Millikan et al. |
| 5,892,598 | A | 4/1999 | Asakawa et al. |
| 5,913,594 | A | 6/1999 | Iimura |
| 5,920,417 | A | 7/1999 | Johnson |
| 5,956,106 | A | 9/1999 | Petersen |
| 6,008,449 | A | 12/1999 | Cole |
| 6,040,937 | A | 3/2000 | Miles |
| 6,055,090 | A | 4/2000 | Miles |
| 6,074,069 | A | 6/2000 | Chao-Ching |
| 6,099,134 | A | 8/2000 | Taniguchi |
| 6,123,431 | A | 9/2000 | Teragaki |
| 6,151,089 | A * | 11/2000 | Yang et al. ................ 349/113 |
| 6,195,196 | B1 | 2/2001 | Kimura |
| 6,199,989 | B1 | 3/2001 | Maeda et al. |
| 6,259,082 | B1 | 7/2001 | Fujimoto et al. |
| 6,273,577 | B1 | 8/2001 | Goto et al. |
| 6,292,504 | B1 | 9/2001 | Halmos |
| 6,322,901 | B1 | 11/2001 | Bawendi |
| 6,323,415 | B1 | 11/2001 | Uematsu et al. |
| 6,359,668 | B1 | 3/2002 | Iijima |
| 6,371,623 | B1 | 4/2002 | Toyoda |
| 6,377,233 | B2 | 4/2002 | Colgan |
| 6,407,785 | B1 | 6/2002 | Yamazaki |
| 6,412,969 | B1 | 7/2002 | Torihara |
| 6,454,452 | B1 | 9/2002 | Sasagawa |
| 6,504,589 | B1 | 1/2003 | Kashima |
| 6,519,073 | B1 | 2/2003 | Goossen |
| 6,522,794 | B1 | 2/2003 | Bischel |
| 6,582,095 | B1 | 6/2003 | Toyoda |
| 6,592,234 | B2 | 7/2003 | Epstein |
| 6,597,490 | B2 | 7/2003 | Tayebati |
| 6,598,987 | B1 | 7/2003 | Parikka |
| 6,603,520 | B2 | 8/2003 | Umemoto |
| 6,631,998 | B2 | 10/2003 | Egawa et al. |
| 6,636,358 | B2 | 10/2003 | Umemoto et al. |
| 6,642,913 | B1 | 11/2003 | Kimura et al. |
| 6,643,067 | B2 | 11/2003 | Miyamae |
| 6,650,455 | B2 | 11/2003 | Miles |
| 6,652,109 | B2 | 11/2003 | Nakamura |
| 6,669,350 | B2 | 12/2003 | Yamashita |
| 6,674,562 | B1 | 1/2004 | Miles |
| 6,680,792 | B2 | 1/2004 | Miles |
| 6,683,693 | B1 | 1/2004 | O'Tsuka |
| 6,697,403 | B2 | 2/2004 | Lee et al. |
| 6,741,377 | B2 | 5/2004 | Miles |
| 6,742,907 | B2 | 6/2004 | Funamoto et al. |
| 6,751,023 | B2 | 6/2004 | Umemoto et al. |
| 6,761,461 | B2 | 7/2004 | Mizutani et al. |
| 6,773,126 | B1 | 8/2004 | Hatjasalo |
| 6,792,293 | B1 | 9/2004 | Awan et al. |
| 6,794,119 | B2 | 9/2004 | Miles |
| 6,798,469 | B2 | 9/2004 | Kimura |
| 6,819,380 | B2 | 11/2004 | Wen et al. |
| 6,829,258 | B1 | 12/2004 | Carlisle |
| 6,853,418 | B2 | 2/2005 | Suzuki et al. |
| 6,862,141 | B2 | 3/2005 | Olczak |
| 6,864,882 | B2 | 3/2005 | Newton |
| 6,871,982 | B2 | 3/2005 | Holman et al. |
| 6,879,354 | B1 | 4/2005 | Sawayama |
| 6,880,959 | B2 | 4/2005 | Houston |
| 6,882,461 | B1 | 4/2005 | Tsai |
| 6,883,924 | B2 | 4/2005 | Maeda et al. |
| 6,883,934 | B2 | 4/2005 | Kawakami |
| 6,897,855 | B1 | 5/2005 | Matthies |
| 6,930,816 | B2 | 8/2005 | Mochizuki |
| 6,951,401 | B2 * | 10/2005 | Van Hees et al. ............ 362/612 |
| 6,964,484 | B2 | 11/2005 | Gupta |
| 7,042,444 | B2 | 5/2006 | Cok |
| 7,042,643 | B2 | 5/2006 | Miles |
| 7,050,219 | B2 | 5/2006 | Kimura |
| 7,056,001 | B2 | 6/2006 | Chuang |
| 7,072,093 | B2 | 7/2006 | Piehl |
| 7,072,096 | B2 | 7/2006 | Holman et al. |
| 7,123,216 | B1 | 10/2006 | Miles |
| 7,133,022 | B2 | 11/2006 | Grabert |
| 7,142,347 | B2 | 11/2006 | Islam |
| 7,187,489 | B2 | 3/2007 | Miles |
| 7,236,663 | B2 | 6/2007 | Wakita et al. |
| 7,342,705 | B2 | 3/2008 | Chui et al. |
| 7,346,251 | B2 | 3/2008 | Bose |
| 7,349,139 | B2 | 3/2008 | Chui |
| 7,349,141 | B2 | 3/2008 | Tung |
| 7,352,940 | B2 | 4/2008 | Charters |
| 7,355,780 | B2 | 4/2008 | Chui |
| 7,357,552 | B2 | 4/2008 | Takada |
| 7,357,557 | B2 | 4/2008 | Miyashita |
| 7,366,393 | B2 | 4/2008 | Cassarly |
| 7,377,678 | B2 | 5/2008 | Huang |
| 7,389,476 | B2 | 6/2008 | Senda et al. |
| 7,477,809 | B1 * | 1/2009 | Tan et al. ................ 385/14 |
| 7,520,642 | B2 | 4/2009 | Holman et al. |
| 7,561,133 | B2 | 7/2009 | Mestha |
| 7,561,323 | B2 | 7/2009 | Gally |
| 7,564,612 | B2 | 7/2009 | Chui |
| 7,603,001 | B2 | 10/2009 | Wang |
| 7,663,714 | B2 * | 2/2010 | Haga et al. ................ 349/69 |
| 7,719,747 | B2 | 5/2010 | Tung |
| 7,750,886 | B2 | 7/2010 | Sampsell |
| 7,766,498 | B2 | 8/2010 | Sampsell |
| 2001/0003504 | A1 | 6/2001 | Ishihara |
| 2001/0010630 | A1 | 8/2001 | Umemoto |
| 2001/0019380 | A1 | 9/2001 | Ishihara |
| 2001/0019479 | A1 | 9/2001 | Nakabayashi |
| 2001/0022636 | A1 | 9/2001 | Yang et al. |
| 2001/0055076 | A1 | 12/2001 | Ochi et al. |
| 2002/0006036 | A1 | 1/2002 | Egawa |
| 2002/0044445 | A1 * | 4/2002 | Bohler et al. ................ 362/293 |
| 2002/0106182 | A1 | 8/2002 | Kawashima |
| 2002/0149584 | A1 | 10/2002 | Simpson |
| 2002/0167730 | A1 | 11/2002 | Needham |
| 2002/0176035 | A1 | 11/2002 | Yamazaki |
| 2003/0012009 | A1 | 1/2003 | Suzuki |
| 2003/0016930 | A1 | 1/2003 | Inditsky |
| 2003/0043157 | A1 * | 3/2003 | Miles ................ 345/540 |
| 2003/0090887 | A1 | 5/2003 | Igarashi |
| 2003/0095401 | A1 | 5/2003 | Hanson |
| 2003/0098957 | A1 * | 5/2003 | Haldiman ................ 353/69 |
| 2003/0103344 | A1 | 6/2003 | Niida |
| 2003/0160919 | A1 | 8/2003 | Suzuki |
| 2003/0165067 | A1 | 9/2003 | Imamura |
| 2003/0169385 | A1 | 9/2003 | Okuwaki |
| 2003/0193630 | A1 | 10/2003 | Chiou |
| 2003/0210222 | A1 | 11/2003 | Ogiwara |
| 2003/0210367 | A1 | 11/2003 | Nakano |
| 2003/0214728 | A1 | 11/2003 | Olczak |
| 2003/0231483 | A1 | 12/2003 | Higashiyama |
| 2004/0001169 | A1 | 1/2004 | Saiki |
| 2004/0017599 | A1 | 1/2004 | Yang |
| 2004/0027315 | A1 | 2/2004 | Senda et al. |
| 2004/0042233 | A1 | 3/2004 | Suzuki |
| 2004/0051929 | A1 | 3/2004 | Sampsell |
| 2004/0061946 | A1 | 4/2004 | Yoshikawa |
| 2004/0070711 | A1 | 4/2004 | Wen |
| 2004/0080938 | A1 | 4/2004 | Holman |
| 2004/0085748 | A1 | 5/2004 | Sugiura |
| 2004/0100796 | A1 | 5/2004 | Ward |
| 2004/0170373 | A1 | 9/2004 | Kim |
| 2004/0184134 | A1 | 9/2004 | Makigaki |
| 2004/0218390 | A1 | 11/2004 | Holman |
| 2005/0002082 | A1 | 1/2005 | Miles |
| 2005/0024849 | A1 | 2/2005 | Parker |
| 2005/0041175 | A1 | 2/2005 | Akiyama |

| | | | | | | |
|---|---|---|---|---|---|---|
| 2005/0120553 | A1 | 6/2005 | Brown | EP | 1 113 218 | 7/2001 |
| 2005/0195175 | A1 | 9/2005 | Anderson | EP | 1 127 984 | 8/2001 |
| 2005/0195370 | A1 | 9/2005 | Gore | EP | 1 143 270 | 10/2001 |
| 2005/0231977 | A1 | 10/2005 | Hayakawa | EP | 1 231 757 | 8/2002 |
| 2005/0231981 | A1 | 10/2005 | Hoelen et al. | EP | 1 251 454 | 10/2002 |
| 2005/0248524 | A1 | 11/2005 | Feng | EP | 1 271 223 | 1/2003 |
| 2005/0259939 | A1 | 11/2005 | Rinko | EP | 1 296 094 | 3/2003 |
| 2005/0286113 | A1 | 12/2005 | Miles | EP | 1 306 609 | 5/2003 |
| 2006/0001942 | A1 | 1/2006 | Chui | EP | 1 336 876 | 8/2003 |
| 2006/0002141 | A1 | 1/2006 | Ouderkirk | EP | 1 341 025 | 9/2003 |
| 2006/0024017 | A1 | 2/2006 | Page | EP | 1 389 775 | 2/2004 |
| 2006/0044523 | A1 | 3/2006 | Teijido | EP | 1 413 543 | 4/2004 |
| 2006/0050032 | A1 | 3/2006 | Gunner | EP | 1 437 610 | 7/2004 |
| 2006/0062016 | A1 | 3/2006 | Dejima | EP | 1 445 629 | 8/2004 |
| 2006/0066541 | A1 | 3/2006 | Gally | EP | 1 450 418 | 8/2004 |
| 2006/0066586 | A1 | 3/2006 | Gally | EP | 1 519 218 A1 | 3/2005 |
| 2006/0066783 | A1 | 3/2006 | Sampsell | EP | 1 531 302 | 5/2005 |
| 2006/0066935 | A1 | 3/2006 | Cummings | EP | 1 640 961 | 3/2006 |
| 2006/0067651 | A1 | 3/2006 | Chui | EP | 1 698 918 | 9/2006 |
| 2006/0072315 | A1 | 4/2006 | Han et al. | EP | 2 040 114 | 3/2009 |
| 2006/0072339 | A1 | 4/2006 | Li et al. | GB | 2 315 356 | 1/1998 |
| 2006/0083028 | A1 | 4/2006 | Sun et al. | GB | 2 336 933 | 3/1999 |
| 2006/0114244 | A1 | 6/2006 | Saxena | JP | 57-3266 | 1/1982 |
| 2006/0132383 | A1 | 6/2006 | Gally | JP | 58 115781 | 8/1983 |
| 2006/0164861 | A1 | 7/2006 | Maeda | JP | 60 165621 A | 8/1985 |
| 2006/0181866 | A1 | 8/2006 | Jung | JP | 360242408 A * | 12/1985 |
| 2006/0198013 | A1 | 9/2006 | Sampsell | JP | 57 3266 | 1/1992 |
| 2006/0209012 | A1 | 9/2006 | Hagood, IV | JP | 06-265870 A | 9/1994 |
| 2006/0209385 | A1 | 9/2006 | Liu | JP | 08 050283 A | 2/1996 |
| 2006/0262562 | A1 | 11/2006 | Fukasawa | JP | 09 160032 | 6/1997 |
| 2006/0265919 | A1 | 11/2006 | Huang | JP | 09 311333 | 12/1997 |
| 2006/0285356 | A1 | 12/2006 | Tseng | JP | 10 500224 | 1/1998 |
| 2007/0081360 | A1 | 4/2007 | Bailey | JP | 10-096910 | 4/1998 |
| 2007/0097694 | A1 | 5/2007 | Faase | JP | 10 325953 | 12/1998 |
| 2007/0116424 | A1 | 5/2007 | Ting | JP | 11-052887 | 2/1999 |
| 2007/0125415 | A1 | 6/2007 | Sachs | JP | 11 052887 | 2/1999 |
| 2007/0133226 | A1 | 6/2007 | Mi | JP | 11 211999 | 8/1999 |
| 2007/0153243 | A1 | 7/2007 | Mestha et al. | JP | 11 231321 | 8/1999 |
| 2007/0171418 | A1 | 7/2007 | Nyhart | JP | 11 249132 | 9/1999 |
| 2007/0187852 | A1 | 8/2007 | Parker et al. | JP | 11 316553 | 11/1999 |
| 2007/0189036 | A1 | 8/2007 | Chen | JP | 2000-075287 | 3/2000 |
| 2007/0201234 | A1 | 8/2007 | Ottermann | JP | 2000 075293 | 3/2000 |
| 2007/0229737 | A1 | 10/2007 | Takeda | JP | 2000 181367 | 6/2000 |
| 2007/0241340 | A1 * | 10/2007 | Pan ............................... 257/79 | JP | 2000 193933 | 7/2000 |
| 2007/0253717 | A1 | 11/2007 | Charters | JP | 2002-014344 | 1/2002 |
| 2007/0285406 | A1 | 12/2007 | Kukulj | JP | 2002 014344 | 1/2002 |
| 2007/0297191 | A1 | 12/2007 | Sampsell | JP | 2002 196151 | 7/2002 |
| 2008/0049445 | A1 | 2/2008 | Harbers | JP | 2002 523798 | 7/2002 |
| 2008/0074402 | A1 | 3/2008 | Cornish | JP | 2002-229023 | 8/2002 |
| 2008/0079687 | A1 | 4/2008 | Cernasov | JP | 2002 245835 | 8/2002 |
| 2008/0192484 | A1 | 8/2008 | Lee | JP | 2003 007114 | 1/2003 |
| 2008/0232135 | A1 | 9/2008 | Kinder | JP | 2003 131215 | 5/2003 |
| 2008/0278460 | A1 | 11/2008 | Arnett et al. | JP | 2003 140118 | 5/2003 |
| 2009/0086466 | A1 | 4/2009 | Sugita | JP | 2003 173713 | 6/2003 |
| 2009/0126777 | A1 | 5/2009 | Khazeni | JP | 2003 188959 | 7/2003 |
| 2009/0168459 | A1 | 7/2009 | Holman | JP | 2003 195201 | 7/2003 |
| 2009/0190373 | A1 | 7/2009 | Bita et al. | JP | 2003-315694 | 11/2003 |
| 2009/0201301 | A1 | 8/2009 | Mienko | JP | 2004-070189 | 3/2004 |
| 2009/0225394 | A1 | 9/2009 | Chui | JP | 2004 070189 | 3/2004 |
| 2009/0255569 | A1 | 10/2009 | Sampsell | JP | 2004 087409 | 3/2004 |
| 2009/0296194 | A1 | 12/2009 | Gally | JP | 2004 126196 | 4/2004 |
| 2009/0303417 | A1 | 12/2009 | Mizushima | JP | 2004-126196 | 4/2004 |
| 2009/0310208 | A1 | 12/2009 | Wang | JP | 2004 145109 | 5/2004 |
| 2009/0323153 | A1 | 12/2009 | Sampsell | JP | 2004-219843 A | 8/2004 |
| 2010/0157406 | A1 | 6/2010 | Gruhlke | JP | 2005 031219 | 2/2005 |
| 2010/0182308 | A1 | 7/2010 | Holman | JP | 2006-065360 A | 3/2006 |
| | | | | WO | WO 95/01584 | 1/1995 |
| | | FOREIGN PATENT DOCUMENTS | | WO | WO 95/15582 A1 | 6/1995 |
| CN | | 101226259 | 7/2008 | WO | WO 95/30924 | 11/1995 |
| DE | | 199 42 513 | 3/2001 | WO | WO 96/16348 | 5/1996 |
| DE | | 19942513 A1 * | 3/2001 | WO | WO 98/19201 | 5/1998 |
| DE | | 102007025092 A1 * | 5/2009 | WO | 98 52094 | 11/1998 |
| EP | | 0 590 511 | 4/1994 | WO | WO 98/52094 | 11/1998 |
| EP | | 0 822 441 | 2/1998 | WO | WO 99/04296 A | 1/1999 |
| EP | | 0 867 747 A2 | 9/1998 | WO | WO 99/63394 | 12/1999 |
| EP | | 0 879 991 | 11/1998 | WO | WO 00/11502 | 3/2000 |
| EP | | 0 907 050 | 4/1999 | WO | WO 00/50807 | 8/2000 |
| EP | | 1 089 115 | 4/2001 | WO | WO 01/84228 | 11/2001 |
| EP | | 1 093 105 | 4/2001 | WO | WO 01/84229 | 11/2001 |

| WO | WO 02/071132 | 9/2002 |
| --- | --- | --- |
| WO | WO 02/097324 | 12/2002 |
| WO | WO 03/007049 | 1/2003 |
| WO | WO 03/056876 | 7/2003 |
| WO | WO 03/105198 | 12/2003 |
| WO | WO 2004/003643 | 1/2004 |
| WO | WO 2004/006003 | 1/2004 |
| WO | 2004 012004 | 2/2004 |
| WO | WO 2004/012004 | 2/2004 |
| WO | WO 2004/088372 | 10/2004 |
| WO | WO 2005/011012 | 2/2005 |
| WO | WO 2005/076051 | 8/2005 |
| WO | WO 2005/088367 | 9/2005 |
| WO | WO 2006/008702 | 1/2006 |
| WO | WO 2006/036415 | 4/2006 |
| WO | WO 2006/036451 | 4/2006 |
| WO | WO 2006/036496 | 4/2006 |
| WO | WO 2007/073203 A1 | 6/2007 |
| WO | WO 2008/045218 | 4/2008 |
| WO | WO 2008/045311 | 4/2008 |

OTHER PUBLICATIONS

Extended European Search Report in European Application No. 08153690.6 dated Mar. 5, 2009.
Extended European Search Report in App. No. 08153691.4 dated Mar. 25, 2009.
International Preliminary Report on Patentability in PCT/US2005/030441 dated Apr. 5, 2007.
International Search Report and Written Opinion in PCT/US2005/030441(International Publication No. WO 2006/036415) dated Dec. 12, 2005.
Application as filed in U.S. Appl. No. 12/821,070 dated Jun. 22, 2010.
Office Action in U.S. Appl. No. 11/187,784 dated Oct. 7, 2008.
Amendment and Response in U.S. Appl. No. 11/187,784 dated Nov. 19, 2008.
Office Action in U.S. Appl. No. 11/187,784 dated Feb. 17, 2009.
Amendment and Response in U.S. Appl. No. 11/187,784 dated Mar. 30, 2009.
Notice of Allowance in U.S. Appl. No. 11/187,784 dated Jun. 5, 2009.
RCE and IDS in U.S. Appl. No. 11/187,784 dated Sep. 3, 2009.
Notice of Allowance in U.S. Appl. No. 11/187,784 dated Oct. 21, 2009.
RCE and IDS in U.S. Appl. No. 11/187,784 dated Jan. 20, 2010.
Notice of Allowance in U.S. Appl. No. 11/187,784 dated Feb. 8, 2010.
Amendment under 37 CFR 1.312 in U.S. Appl. No. 11/187,784 dated May 7, 2010.
Extended European Search Report for Application No. EP 08 07 5318 dated Mar. 5, 2009.
Official Communication in European Application No. 05 791 508.4 (Publication No. EP 2040114) dated Jul. 19, 2007.
Official Communication in Chinese Application No. 200580030964.X dated Jun. 6, 2008.
Substantive Examination Report in Malaysian App. No. PI 20054177 dated Apr. 10, 2009.
Official Communication in Russian Application No. 2007115881 dated Aug. 25, 2009.
Substantive Examination Report in Malaysian Patent Application No. PI20054177 dated Dec. 15, 2009.
Official Communication in European Patent Application No. 08 075 318.9 dated Oct. 30, 2009.
Preliminary Amendment in U.S. Appl. No. 12/821,070 dated Aug. 24, 2010.
Fan et al., "Channel Drop Filters in Photonic Crystals", Optics Express, vol. 3, No. 1, pp. 4-11, 1998.
Giles et al., "Silicon MEMS Optical Switch Attenuator and Its Use in Lightwave Subsystems", IEEE Journal of Selected Topics in Quantum Electronics, vol. 5. No. 1, pp. 18-25, Jan./Feb. 1999.
Little et al., "Vertically Coupled Microring Rosonator Channel Dropping Filter", IEEE Photonics Technology Letters, vol. 11, No. 2, pp. 215-217, 1999.
Magel, "Integrated Optic Devices Using Micromachined Metal Membranes", SPIE vol. 2686, 0-8194-2060-3, pp. 54-63, 1996.
Mehregany, et. al., "MEMS applications in Optical Systems," IEEE/LEOS 1996 Summer Topical Meetings, pp. 75-76, Aug. 1996.
Miles, M., et. al., "Digital Paper™ for reflective displays," Journal of the Society for Information Display, Society for Information Display, San Jose, US, vol. 11, No. 1, pp. 209-215, 2003.
Miles, M.W., "Interferometric Modulation MOEMS as an enabling technology for high-performance reflective displays," Proceedings of the SPIE, vol. 4985, pp. 131-139, 28, Jan. 2003.
Neal T.D., et. al., "Surface Plasmon enhanced emission from dye doped polymer layers," Optics Express Opt. Soc. America, USA, vol. 13, No. 14, pp. 5522-5527, Jul. 11, 2005.
Oliner, "Radiating Elements and Mutual Coupling," Microwave Scanning Antennas, vol. 2, pp. 131-157 and pp. 190-194, 1966.
OSRAM Opto Semiconductors, "Multi Micro SIDELED," Preliminary Data, Dec. 11, 2008.
Tai C.Y., et. al., "A Transparent Frontlighting System for Reflective-Type Displays," 1995 SID International Symposium Digest of Technical Papers, vol. 26, pp. 375-378, May 23, 1995.
Zhou et al., "Waveguide Panel Display Using Electromechanical Spatial Modulators" SID Digest, vol. XXIX, 1998.
Extended Search Report in European Application No. 08075318.9 (Published EP 2 040 114), dated Mar. 5, 2009.
Official Communication in Japanese Application No. 2007-533487, dated Sep. 7, 2010.
Notice of Allowance in U.S. Appl. No. 12/423,354 mailed Sep. 1, 2010.
RCE and IDS in U.S. Appl. No. 12/423,354 mailed Sep. 14, 2010.
Partial European Search Report in EP10176266 dated Dec. 9, 2010.
Extended European Search Report in EP10176261 dated Dec. 8, 2010.
Office Action in Japanese Application No. 2007-533487 mailed Sep. 7, 2010.

* cited by examiner

|  | Column Output Signals | |
|---|---|---|
|  | $+V_{bias}$ | $-V_{bias}$ |
| Row Output Signals  0 | Stable | Stable |
| $+\Delta V$ | Relax | Actuate |
| $-\Delta V$ | Actuate | Relax |

LIGHT ILLUMINATION OF DISPLAYS WITH FRONT LIGHT GUIDE AND COUPLING ELEMENTS

BACKGROUND

1. Field

The present invention relates to microelectromechanical systems (MEMS), and more particularly to displays comprising MEMS.

2. Description of the Related Art

Microelectromechanical systems (MEMS) include micro mechanical elements, actuators, and electronics. Micromechanical elements may be created using deposition, etching, and/or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY

Various embodiments described herein comprise light guides for distributing light across an array of display elements. The light guide may include surface relief features to turn light propagating in a light guide onto the array of display elements. The surface relief features may comprise facets that reflect light. The light guide may be illuminated by a light source placed behind the array of display elements.

In one embodiment of this invention, a display device comprises a reflective spatial light modulator, a light source rearward of the reflective spatial light modulator, a first light guide forward of the reflective spatial light modulator and a turning mirror disposed to receive light from the light source and direct the light into said first light guide. The first light guide is configured to direct the light coupled therein to the reflective spatial light modulator.

In another embodiment of this invention, a display device comprises a reflective spatial light modulator, a light source, a light bar disposed to receive light from the light source, a light guide forward of said reflective spatial light modulator and an optical coupler disposed to receive light from the light bar and direct said light into said light guide. The light guide is configured to direct the light coupled therein to the reflective spatial light modulator.

In one embodiment, a display device comprises a means for reflectively modulating light. The display device further comprises a means for illuminating; a means for receiving light from the illuminating means; a means for guiding light disposed forward of the reflectively light modulating means; and a means for coupling light disposed to receive light from the light receiving means and directing the light into the light guiding means. The light guiding means is configured to direct the light coupled therein to the reflectively light modulating means.

In another embodiment, a display device comprises a means for reflectively modulating light; a means for illuminating disposed rearward of the reflectively light modulating means; a first means for guiding light forward of the reflectively light modulating means; and a means for reflecting light disposed to receive light from the illuminating means and direct the light into the first light guiding means. The first light guiding means is configured to direct the light coupled therein to the reflectively light modulating means.

In a certain embodiment, a method of manufacturing a display device comprises providing a reflective spatial light modulator. The method further comprises disposing a light source rearward of the reflective spatial light modulator, disposing a first light guide forward of the reflective spatial light modulator and disposing a turning mirror to receive light from the light source and direct the light into the first light guide.

In another embodiment, a method of manufacturing a display device comprises providing a reflective spatial light modulator. The method further comprises providing a light source, disposing a light bar to receive light from the light source and disposing a light guide forward of the reflective spatial light modulator. The method also comprises disposing an optical coupler to receive light from the light bar and direct the light into the light guide.

In another embodiment, a display device comprises a means for reflectively modulating light; a means for illuminating disposed forward of the reflectively light modulating means; a first means for guiding light forward of the reflectively light modulating means; and a means for reflecting light disposed to receive light from the illuminating means and direct the light into the first light guiding means. The first light guiding means is configured to direct the light coupled therein to the reflectively light modulating means.

In one embodiment, a display device comprises a reflective spatial light modulator; a light source forward of the reflective spatial light modulator; a first light guide forward of the reflective spatial light modulator; and a turning mirror disposed to receive light from the light source and direct the light into the first light guide. The first light guide is configured to direct said light coupled therein to the reflective spatial light modulator.

In a certain embodiment, a method of manufacturing a display device comprises providing a reflective spatial light modulator. The method further comprises disposing a light source forward of the reflective spatial light modulator, disposing a first light guide forward of the reflective spatial light modulator and disposing a turning mirror to receive light from the light source and direct the light into the first light guide.

BRIEF DESCRIPTION OF THE DRAWINGS

Example embodiments disclosed herein are illustrated in the accompanying schematic drawings, which are for illustrative purposes only.

DETAILED DESCRIPTION OF CERTAIN PREFERRED EMBODIMENTS

Figure 1:
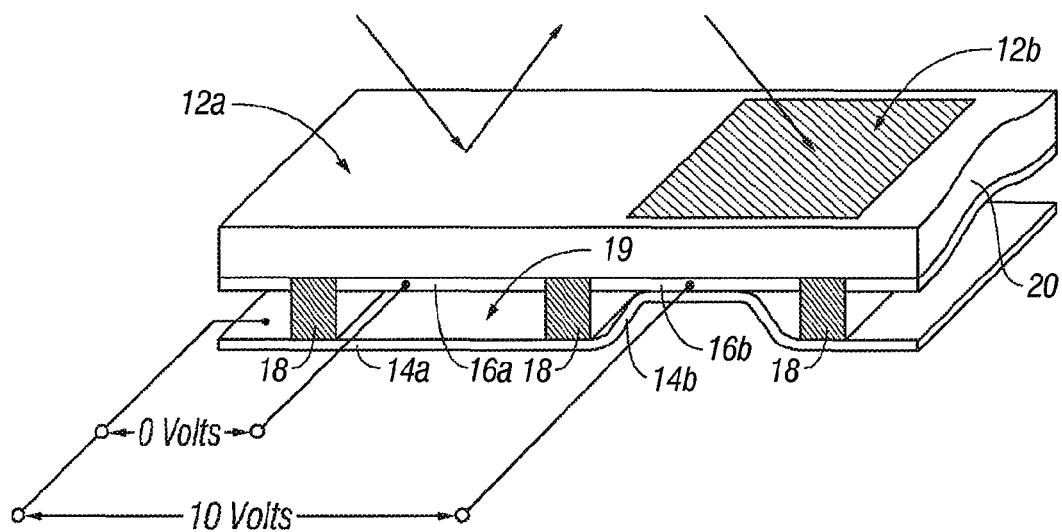
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

In various embodiments described herein, a display device includes a front illumination apparatus that comprises a light guide disposed forward of an array of display elements, such as an array of interferometric modulators, to distribute light across the array of display elements. For example, a light guide panel may comprise a transparent sheet or plate and a turning film thereon. The light guide panel is edge illuminated by a light source and at least a portion of this light is delivered uniformly across the array of display elements. For many portable display applications, however, it is useful for the display to be compact. Accordingly, in various embodiments described herein, the light source is positioned directly behind the array display elements to reduce the footprint of display device. In certain embodiments, for example, two light guide panels may be used. A first light guide is disposed forward to the display elements and a second light guide is disposed rearward to the display elements. The second light guide is edge illuminated by the light source. The first guide comprises the substrate supporting the array of display elements and a turning film formed thereon. A small optical coupling element such as, for example, a turning mirror is used to couple light from the second light guide to the first light guide. The second light guide may comprise the substrate supporting the display elements or the backplate of the display device in certain embodiments. In some embodiments, the first light guide comprises the substrate and the second light guide comprises the backplate. Such designs may be useful in addressing the size or form factor restrictions. The second light guide is thin as compared to the substrate and the array of display elements. As a consequence, the overall thickness of the entire display is only slightly increased beyond that of the display elements themselves which are formed on a substrate. The footprint however is reduced by locating light sources behind the display element rather than on the side thereof.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical gap with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise several fused layers, which can include an electrode layer, such as indium tin oxide (ITO), a partially reflective layer, such as chromium, and a transparent dielectric. The optical stack 16 is thus electrically conductive, partially transparent, and partially reflective, and may be fabricated, for example, by depositing one or more of the above layers onto a transparent substrate 20. The partially reflective layer can be formed from a variety of materials that are partially reflective such as various metals, semiconductors, and dielectrics. The partially reflective layer can be formed of one or more layers of materials, and each of the layers can be formed of a single material or a combination of materials.

In some embodiments, the layers of the optical stack 16 are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the gap 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5B illustrate one exemplary process and system for using an array of interferometric modulators in a display application.

Figure 2:
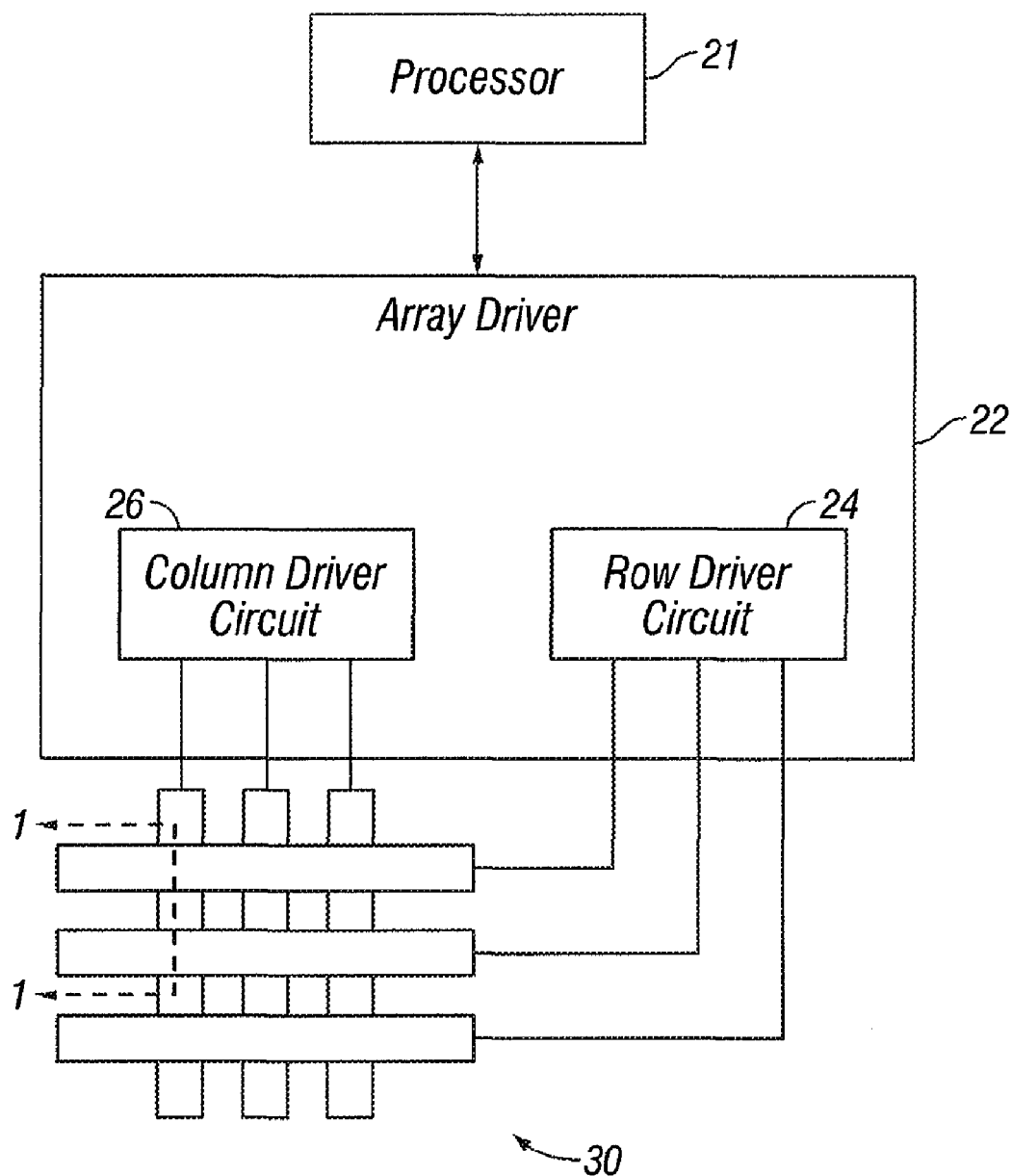
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. Thus, there exists a window of applied voltage, about 3 to 7 V in the example illustrated in FIG. 3, within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
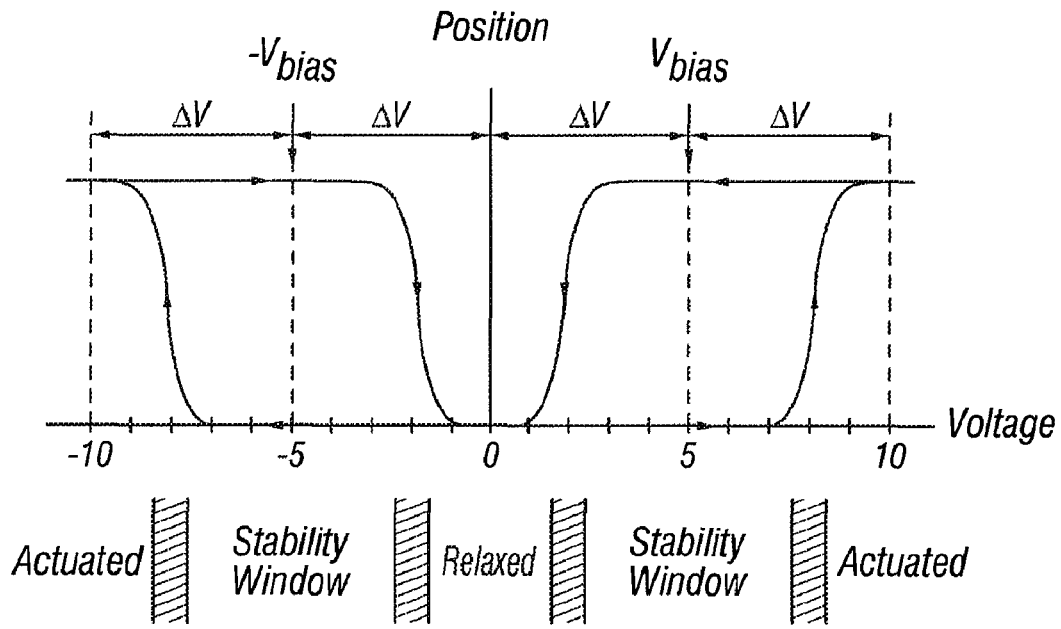
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.
Figure 5A:
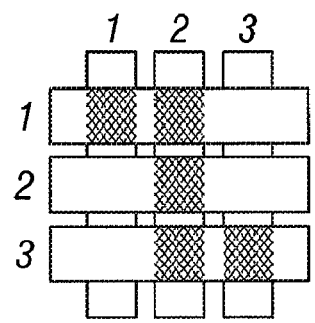
FIG. 5A illustrates one exemplary frame of display data in the 3×3 interferometric modulator display of FIG. 2.
Figure 5B:
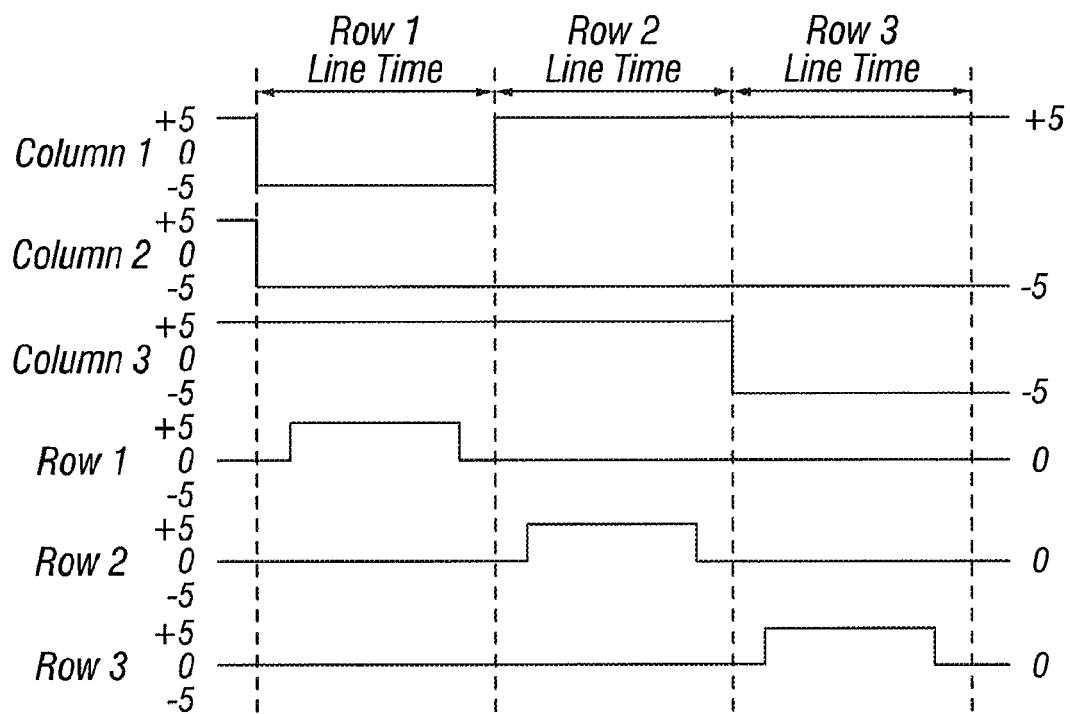
FIG. 5B illustrates one exemplary timing diagram for row and column signals that may be used to write the frame of FIG. 5A.

FIGS. 4, 5A, and 5B illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts, respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
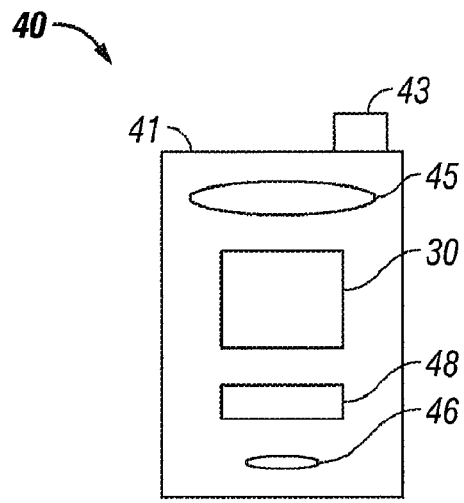
FIGS. 6A and 6B are system block diagrams illustrating an embodiment of a visual display device comprising a plurality of interferometric modulators.
Figure 6B:
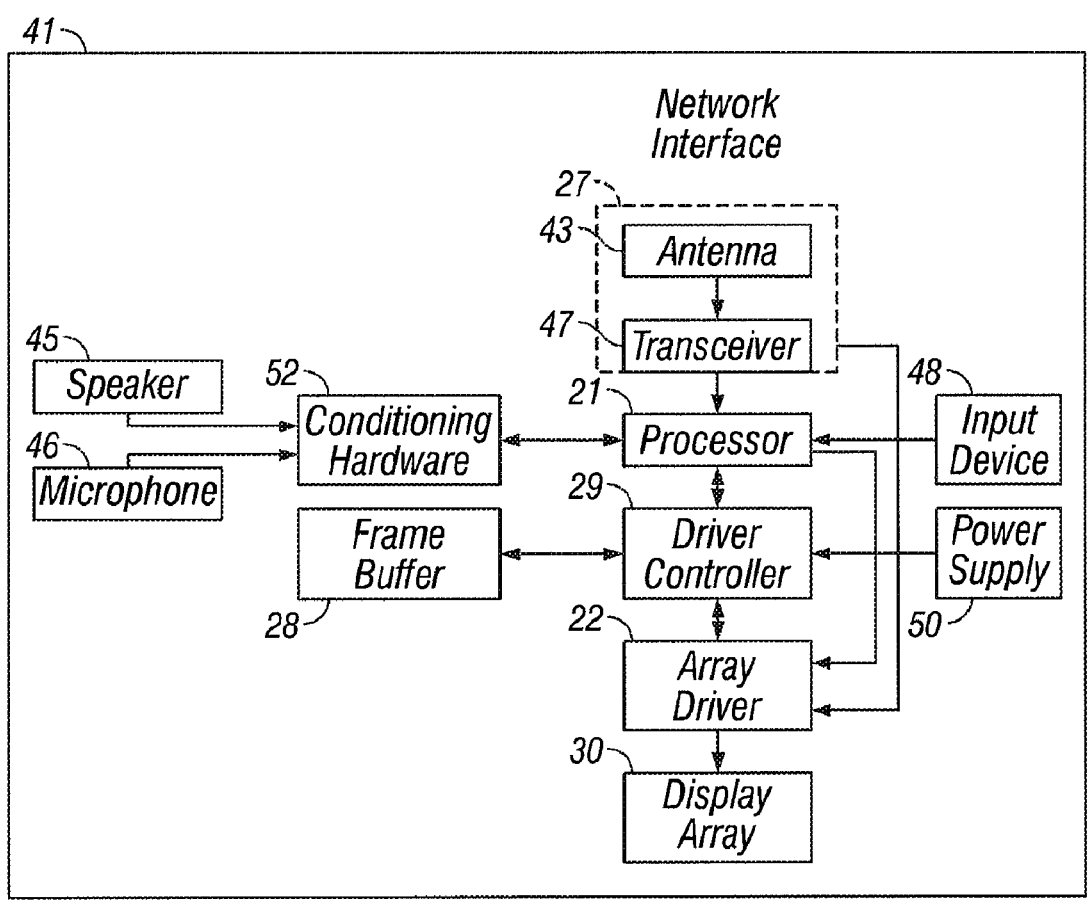

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes as are well known to those of skill in the art, including injection molding and vacuum forming. In addition, the housing 41 may be made from any of a variety of materials, including, but not limited to, plastic, metal, glass, rubber, and ceramic, or a combination thereof. In one embodiment, the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43, which is coupled to a transceiver 47. The transceiver 47 is connected to a processor 21, which is connected to conditioning hardware 52. The conditioning hardware 52 may be configured to condition a signal (e.g., filter a signal). The conditioning hardware 52 is connected to a speaker 45 and a microphone 46. The processor 21 is also connected to an input device 48 and a driver controller 29. The driver controller 29 is coupled to a frame buffer 28 and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one or more devices over a network. In one embodiment, the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS, or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, or a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell including a plastic solar cell, and solar-cell paint. In another embodiment, power supply 50 is configured to receive power from a wall outlet.

In some embodiments, control programmability resides, as described above, in a driver controller which can be located in several places in the electronic display system. In some embodiments, control programmability resides in the array driver 22. Those of skill in the art will recognize that the above-described optimizations may be implemented in any number of hardware and/or software components and in various configurations.

Figure 7A:
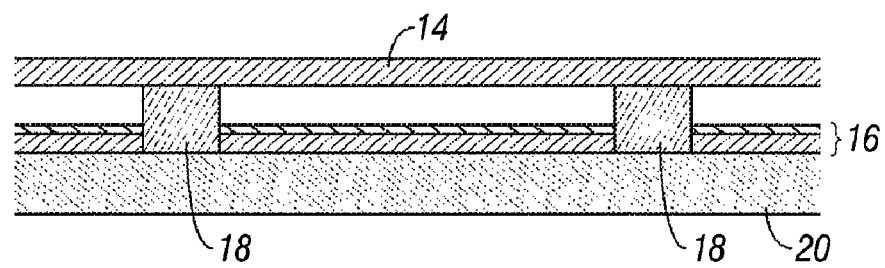
FIG. 7A is a cross section of the device of FIG. 1.
Figure 7B:
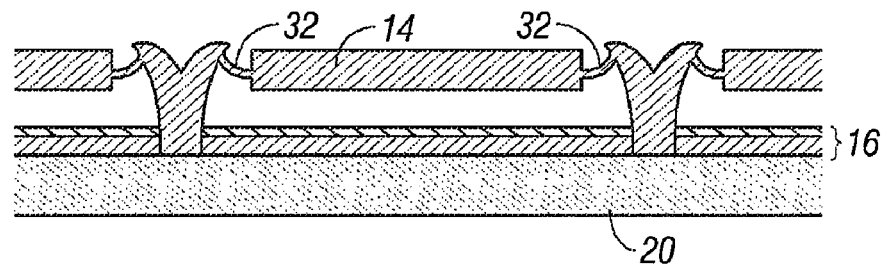
FIG. 7B is a cross section of an alternative embodiment of an interferometric modulator.
Figure 7C:
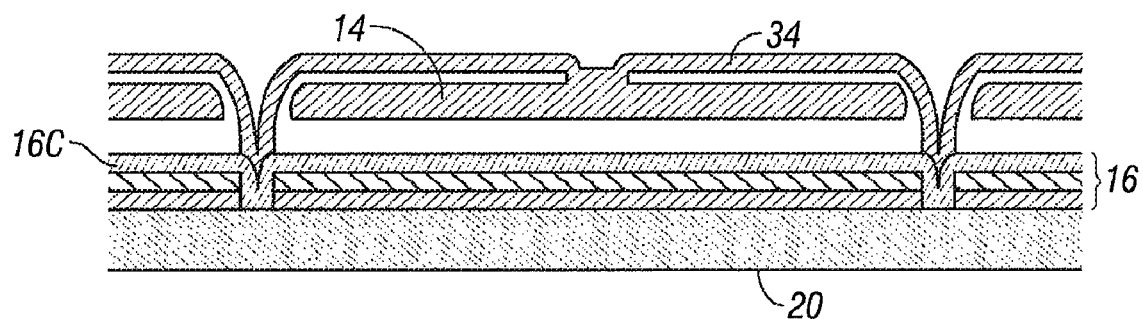
FIG. 7C is a cross section of another alternative embodiment of an interferometric modulator.
Figure 7D:
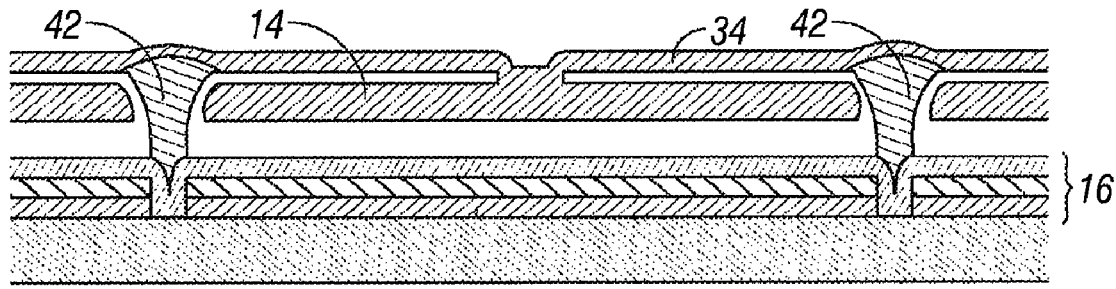
FIG. 7D is a cross section of yet another alternative embodiment of an interferometric modulator.
Figure 7E:
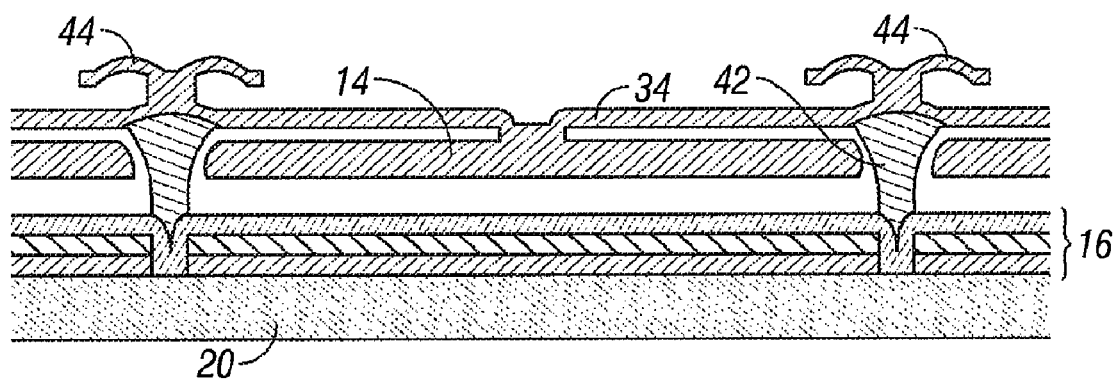
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and it's supporting structures. FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the gap, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C, as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34. This allows the shielded areas to be configured and operated upon without negatively affecting the image quality. Such shielding allows the bus structure 44 in FIG. 7E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

Figure 8:
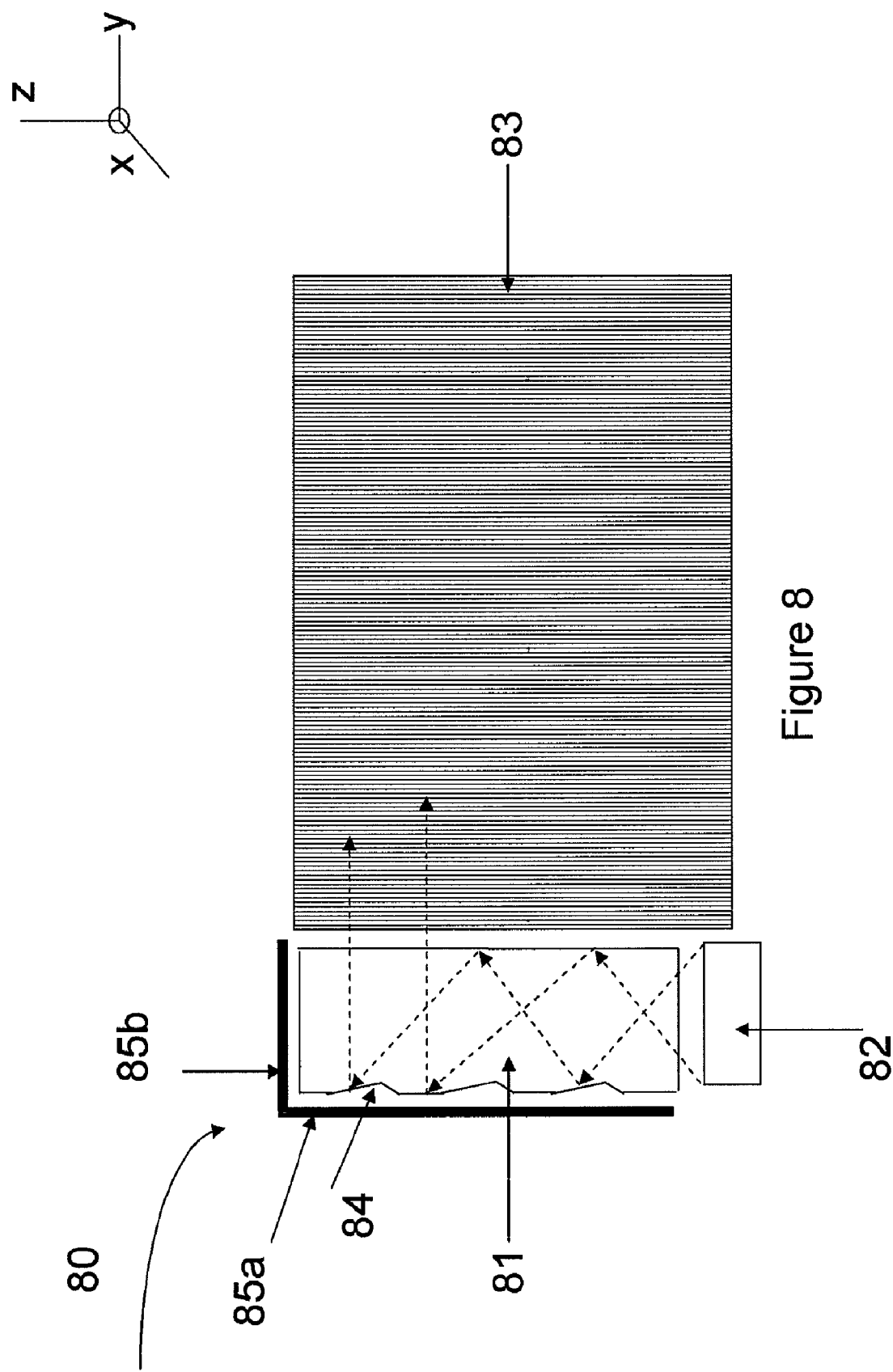
FIG. 8 is a top view of a display device comprising a light source, a light bar reflector and a light guide panel that can illuminate an array of interferometric modulators.

As described above, the interferometric modulators are reflective display elements and can rely on ambient lighting in daylight or well-lit environments. In addition, an internal source of illumination can be provided for illuminating these reflective display elements in dark ambient environments. The illumination for reflective displays may be provided by a front illuminator. FIG. 8 shows the top view of a portion of a display device 80 comprising an illumination apparatus configured to provide front illumination. The display device 80 comprises a light source 82, a light bar 81 and a light guide panel 83. The light source 82 in this particular embodiment comprises an LED. The light bar 81 is disposed with respect to the light source 82 to receive light therefrom. Reflective sections 85a and 85b are disposed with respect to the side and end of the light bar 81. Reflectors may also be included above and/or below the light bar 81. The light bar 81 comprises substantially optically transmissive material that supports propagation of light along the length thereof. Light emitted from the light emitter 82 propagates into the light bar 81 and is guided therein, for example, via total internal reflection at sidewalls of the light bar, which form interfaces with air or some other surrounding medium. The light bar 81 includes turning microstructure 84 on one side that is opposite the light guide panel 83. The turning microstructure 84 is configured to turn a substantial portion of the light incident on that side of the light bar 81 and to direct a portion of this light out of the light bar 81 into the light guide panel 83. In certain embodiments, the illumination apparatus may further comprise a coupling optic (not shown) between the light bar 81 and the light guide panel 83. For example, the coupling optic may collimate light propagating from the light bar 81. Other configurations are also possible.

The light guide panel 83 is disposed with respect to the light bar 81 so as to receive light that has been turned by the turning microstructure 84 and directed out of the light bar 81. In certain embodiments, for example, the light guide panel 83 comprises a sheet or plate having a prismatic film thereon that reflects light from the light bar 81 onto a plurality of display elements (not shown) beneath the light guide panel in FIG. 8. The plurality of display elements may comprise, for example, a plurality of spatial light modulators (e.g. interferometric modulators, liquid crystal elements, etc.).

To reduce the footprint of display device, in certain embodiments the light bar 81 which is disposed adjacent to one edge of the light guide panel 83 in FIG. 8 may be replaced with another smaller optical coupling element such as, for example, a turning mirror. Removing the light bar 81 from the side of the light guide panel 83 reduces the footprint by reducing the dimension of the display device in the X-Y plane. Moreover, the light bar 81 need not be included thereby reducing device complexity and possible cost. Such a configuration may also allow the light source 82 to be positioned behind the plurality of display elements possibly further reducing the footprint. Such designs may be useful in addressing the size or form factor restrictions or other considerations. Various approaches described herein may therefore use a light source behind the display elements and a turning mirror to front illuminate a reflective display element.

Figure 9:
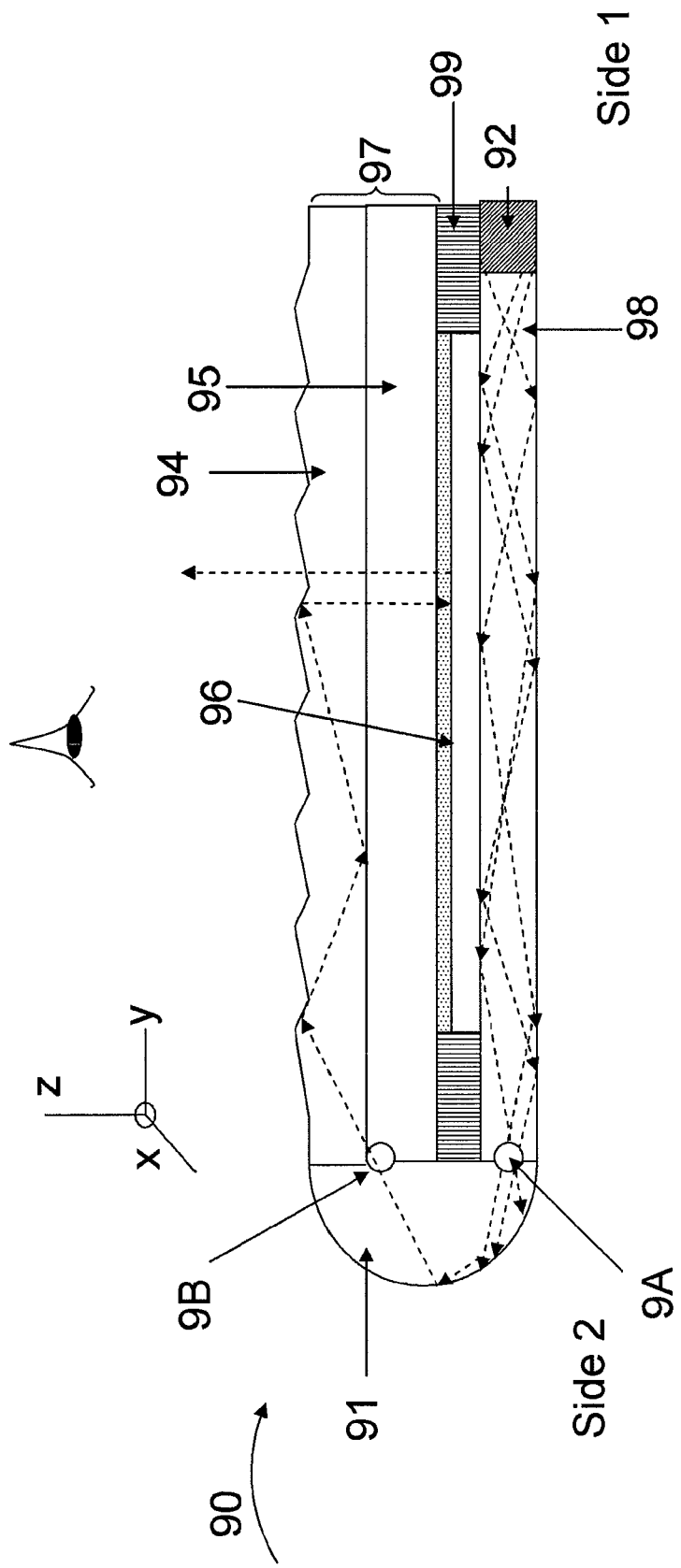
FIG. 9 is a cross section of a portion of an embodiment of a display device comprising of an elliptical turning mirror coupling light from the light source into the light guide panel.

FIG. 9 illustrates a cross section of a portion of one embodiment of a display device 90 wherein the light bar 81 of FIG. 8 is replaced with an optional coupling element. The display device 90 in FIG. 9 comprises a reflective display comprising a plurality of reflective elements 96 such as reflective spatial light modulators. In the embodiment shown in FIG. 9, the reflective display elements 96 comprise interferometric modulators, although other types of display elements may be used in the device. Other examples of display elements include MEMS and liquid crystal structures. The display elements 96 may be formed on an optically transmissive substrate 95. This substrate 95 may provide structural support during and after fabrication of the display elements 96 thereon. The substrate 95 may be substantially transparent such that a viewer can see the display elements 96 through the substrate. In some embodiments the substrate 95 may comprise glass or plastic although other materials may also be used.

In the embodiment shown in FIG. 9, the substrate 95 has a turning film 94 formed thereon. The turning film 94 may comprise, for example, a prismatic film that includes turning features formed therein. In some embodiments, the turning film 94 may comprise a plastic film laminated onto the substrate 95. Adhesive may be used to affix the turning film 94 to the substrate 95. Pressure sensitive adhesive may be used. The adhesive may provide index matching in some embodiments as well. Other methods of attaching the turning film 94 to the substrate 95 may be used. In certain embodiments the turning film 94 can be a multilayer stack instead of a single layer. In case of a multilayer stack, the refractive indices of the different layers may be close so that light is transmitted through the various layers without being substantially reflected or refracted. The film or films may be rigid or flexible. In certain embodiments the film or films have an index of refraction substantially similar to that of the substrate 95.

The substrate 95 and the turning film 94 together form a first light guiding element 97 that is located above the interferometric modulators 96 of the display device 90. In certain embodiments wherein the turning film 94 is attached to the substrate 95 with index matching adhesive, the first light guiding element 97 is increased in thickness. Some advantages of a thicker first light guiding element 97 are the relative ease in achieving uniformity in brightness and increasing the efficiency of the light coupled into the first light guiding element 97.

In some other embodiments, the turning film 94 may be joined to the substrate 95 by an adhesive layer that has substantially lower refractive index than the refractive index of the turning film 94. Other layers or film such as optical isolation layer, diffuser layer or color filter layer may be disposed between the adhesive layer and the substrate. Light is guided in the turning film 94 by total internal reflection at the interface between the turning film and the adhesive layer. In such embodiments, the first light guiding element is formed by the turning film 94 only.

The plurality of turning features in the turning film 94 redirect light normally guided in the light guide 97 such that the light is directed out of the light guide towards the display elements 96. The direction of the turned light forms an angle smaller than 45 degrees from the normal to the surface of the display elements. In various embodiments, light is redirected through the thickness of the first light guide 97 substantially normal to the light guide and the array of display elements 96. Accordingly, such light is no longer totally internally reflected at the lower sidewall of the light guide and exits therethrough. Likewise, the light is transmitted to the interferometric modulators preferably at normal incidence or close thereto.

In some embodiments, the turning features may comprise a plurality of microprisms extending along the length of the first light guide 97. The microprisms may be configured to receive light propagating along the length of the turning film 94 and turn the light through a large angle, usually between about 70-90° with a plurality of grazing incidence reflections. The prismatic microstructures may comprise two or more turning facets angled with respect to one another for reflecting the light at the air/facet interface via total internal reflection and causing the light to be turned toward the array of display elements 96 at near normal incidence or close thereto.

In an alternative embodiment, the turning features may comprise one or more diffractive optical elements or hologram (e.g., volume or surface holograms or grating) configured to receive light normally guided in the first light guide 97 and turn the light such that the light is redirected towards the display elements 96. In certain embodiments, the propagation direction of the turned light forms an angle smaller than 45 degrees from the normal to the display elements 96.

A light source 92 is disposed rearward of the interferometric modulators 96 on a first side (side 1) of the display device 90. A second light guide 98 is disposed with respect to the light source 92 to receive light injected therein by the light source 92. In certain embodiments, the second light guide 98 may comprise the backplate of the display device. In certain other embodiments, the second light guide 98 may comprise an existing backlight in the display device 90. This light source 92 could be a single LED or an array of LEDs extending along an edge of the second light guide 98. In certain embodiments, for example, the light source 92 may comprise a plurality of LEDs parallel to the x-axis that emit light parallel to the y axis (e.g., in the negative y direction) to illuminate the second light guide 98 uniformly. In other embodiments, the light source 92 may comprise an LED emitting in a direction parallel to the x-axis (e.g. in the negative x direction) coupled to a light bar which has turning features that turn a substantial amount of light propagating parallel to the x axis in a direction parallel to the y axis (e.g. in the negative y direction). Other types of emitters may also be used. Additionally, in some embodiments optical lens or other optical components may be used to couple the light from the light source 92 into the second light 98. Optical features may also be included to expand the width of or diverge the beam of light from the light source 92 propagating in the second light guide 98. Such features may be on the input end of the light guide near the light source 92 in some embodiments.

Light emitted from the light source 92 is guided within the second light guide 98 by total internal reflection from side 1 to side 2. In some embodiments, the second light guide 98 may comprise glass or transparent plastic or some other optically transmissive material. In embodiments, for example wherein the second light guide 98 is comprised of glass, the thickness of the second light guide 98 may be from 200 μm to 1 mm. In certain other embodiments, for example wherein the second light guide is comprised of plastic or other flexible material, the thickness of the second light guide may be from 100 μm to 1 mm. Other materials and thicknesses may be used. In certain embodiments, the length of the second light guide 98 is sufficiently long as to allow the light from the light source 92 to spread uniformly across the width of the second light guide 98 (e.g., on side 2 shown in the embodiment depicted in FIG. 9), for example parallel to the x-axis. In some embodiments the second light guide 98 may comprise the transparent backplate of the display device 90. The backplate of the device may be the packaging enclosing and/or supporting the display elements 96. In some embodiments the backplate may form the hermetically sealed package. In certain other embodiments, wherein the backplate of the display device 90 is not transparent, a second light guide 98 may be disposed forward of the backplate. In such embodiments, the second light guide 98 may incorporate refractive features to diverge the light from the light source 92. In some embodiments comprising a main display element and a sub-display element, wherein the main display element is illuminated with a backlight, the second light guide 98 may comprise the backlight. In embodiments, for example wherein the light guide is comprised of a backplate, the thickness of the light guide may be from 400 to 700 μm or may be up to 1 mm or greater. In certain embodiments, for example wherein the light guide is comprised of a separate component rearward of the display, the thickness of the light guide may be 100 to 700 μm. Values outside these ranges are also possible.

Advantageously, the light source 92 and the second light guide 98 are disposed beneath the plurality of display elements 96. Such a configuration may be useful in reducing the footprint occupied by the display devices as compared to devices with a light source and light being disposed in the side of the front light guide panel such as in FIG. 8.

In some embodiments spacers 99 may be used to separate the display element 96 from the second light guide 98. In some embodiments, the spacers 99 may structurally support the second light guide 98 to the rigid substrate 95. In certain other embodiments, the spacers 99 could be other peripheral adhesive features that attach the backplate to the substrate 95.

A turning mirror 91 is disposed to receive light from the edge of the second light guide 98 which is distal to the light source 91 (side 2) and to direct the light into the edge of the first light guide 97 that is proximal to the turning mirror, in those embodiments wherein the turning film 94 is attached to the substrate 95 with an adhesive layer that has substantially lower refractive index than the turning film 94. Alternatively, when the turning film 94 is attached to the substrate 95 with an index matched adhesive layer, the turning mirror 91 is configured to direct light from the edge of the second light guide 98 into the edge of the substrate 95 that is proximal to the turning mirror. In the embodiment shown in FIG. 9, the turning mirror 91 redirects light propagating generally in the negative y direction and cause it to rotate by 180 degrees and propagate generally in the positive y direction by reflecting a substantial portion of the light. In some embodiments greater than 90% of the light may be reflected by the turning mirror 91.

The turning mirror 91 comprises a reflective surface in the shape of a cylinder. In the embodiment shown in FIG. 9, the reflective surface has a curved cross-section in the Z-Y plane (i.e., parallel to the length of the cylinder that is parallel to the X axis). The curved cross-section may be circular, elliptical, other conics or aspheric. The curved cross-section may be smooth or faceted. The facets can be planar or non-planar. The curved surface may be multifaceted comprising, for example, three, four, five, ten or more facets. In the embodiment shown in FIG. 9, the cross section of the surface of the turning mirror 91 is elliptical. The turning mirror 91 also has an optical aperture that overlaps both the edge of the first light guide 97 and the edge of the second light guide 98 in its optical path. In the embodiment shown, the aperture is larger than the thicker of the first and second light guide. In particular, the aperture is as large as first and second light guides and spacers. The height of the turning mirror (e.g., height of aperture) may be between 0.5 and 2.0 mm. In other embodiments, the height of the turning mirror may be between 0.25 and 1.0 mm. In some embodiments, the turning mirror may have width from 0.25 to 1 or to 3 or 4 millimeters. The turning mirror can have other sizes.

In this particular embodiment, the elliptical cross section of the turning mirror 91 has two line foci, represented by points 9A and 9B in the cross sectional view to FIG. 9. The foci are disposed in the middle of the first light guide 97 and second light guide 98 respectively. If the rays of light that emerge from the edges of the second light guide 98 pass through the first focus 9A, the rays of light will after reflection from the mirror 91 pass through the second focus 9B and be injected into the first light guide 97 with good efficiency, e.g. greater than 50%. The light distribution at the edge of the second light guide 98 towards side 2 will be imaged at the edge of the first light guide 97 towards side 2. Other configurations are possible. For example, the foci 9A, 9B need not be disposed precisely at the center or edge of the first and second light guide. Additionally, in certain embodiments, the mirror has different shape such that first and second line foci are not provided.

Regardless of the shape of the turning mirror 91, light is coupled from the second light guide 98 to the first light guide 97 by the turning mirror. For example, light from light source 92 can be coupled into the second light guide 98 at the side 1. The light propagates within the second light guide 98 from the input edge side 1 to output edge side 2 by total internal reflection. The light rays that are incident on the turning mirror 91 are reflected by the turning mirror 91 into the first light guide 97. The turning film 94 turns light guided in the light guide 97 such that the light is redirected towards the display elements 96. The redirected light passes through the guiding portion 97 substantially normal to the light guide and the array of display elements 96 and is transmitted to the interferometric modulators 96 preferably at normal incidence or close thereto.

In another embodiment the reflective surface of the turning mirror may have a parabolic cross-section. In case of the parabolic turning mirror, the light passing through a line focus of the parabolic reflecting surface will emerge in a direction perpendicular to a directrix of the parabola after reflection. In those embodiments having a parabolic turning mirror, the size and shape of the parabolic reflecting surface can be adjusted to increase or maximize the efficiency of coupling light from the second light guide 98 to the first light guide 97.

Figure 10:
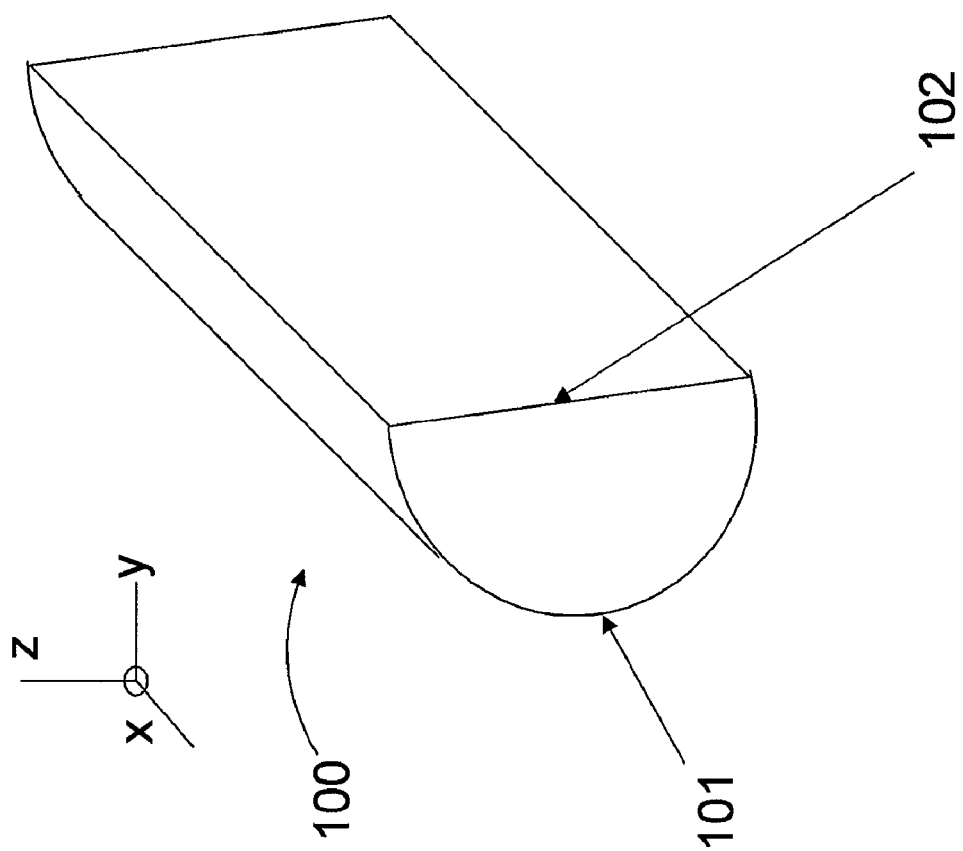
FIG. 10 is a perspective view of a curved turning mirror.

In some embodiments, the turning mirror can be solid as compared to a hollow shell. The turning mirror, for example, may comprise a rod of substantially optically transmissive material such as glass or plastic. FIG. 10 illustrates an embodiment of a solid cylindrical turning mirror 100 with a first curved surface 101 and a second planar surface 102. The curved surface 101 has an elliptical cross section along the Z-Y plane (i.e., perpendicular to the length of the cylinder). The planar surface 102 of the turning mirror is flat and can be contacted to the edge of the display device. The curved surface 101 is coated with a reflective layer. In some embodiments, the reflective layer may be metallic. Other reflective coatings including dielectric coating, interference coating, etc. may be used. Light enters the solid turning mirror through the second planar surface 102 and is reflected at the first curved surface 101.

In some embodiments, the turning mirror may be hollowed out and comprise, for example, a shell having two curved surfaces. One of the curved surfaces may be reflective. In one embodiment, for example, where the turning mirror comprises optically transmissive material such as plastic, one of the curved surfaces may be metalized or have a dielectric or interference coating formed thereon. In other embodiments, the turning mirror may comprise metal with one of the curved surfaces being polished to increase reflectivity.

Figure 11:
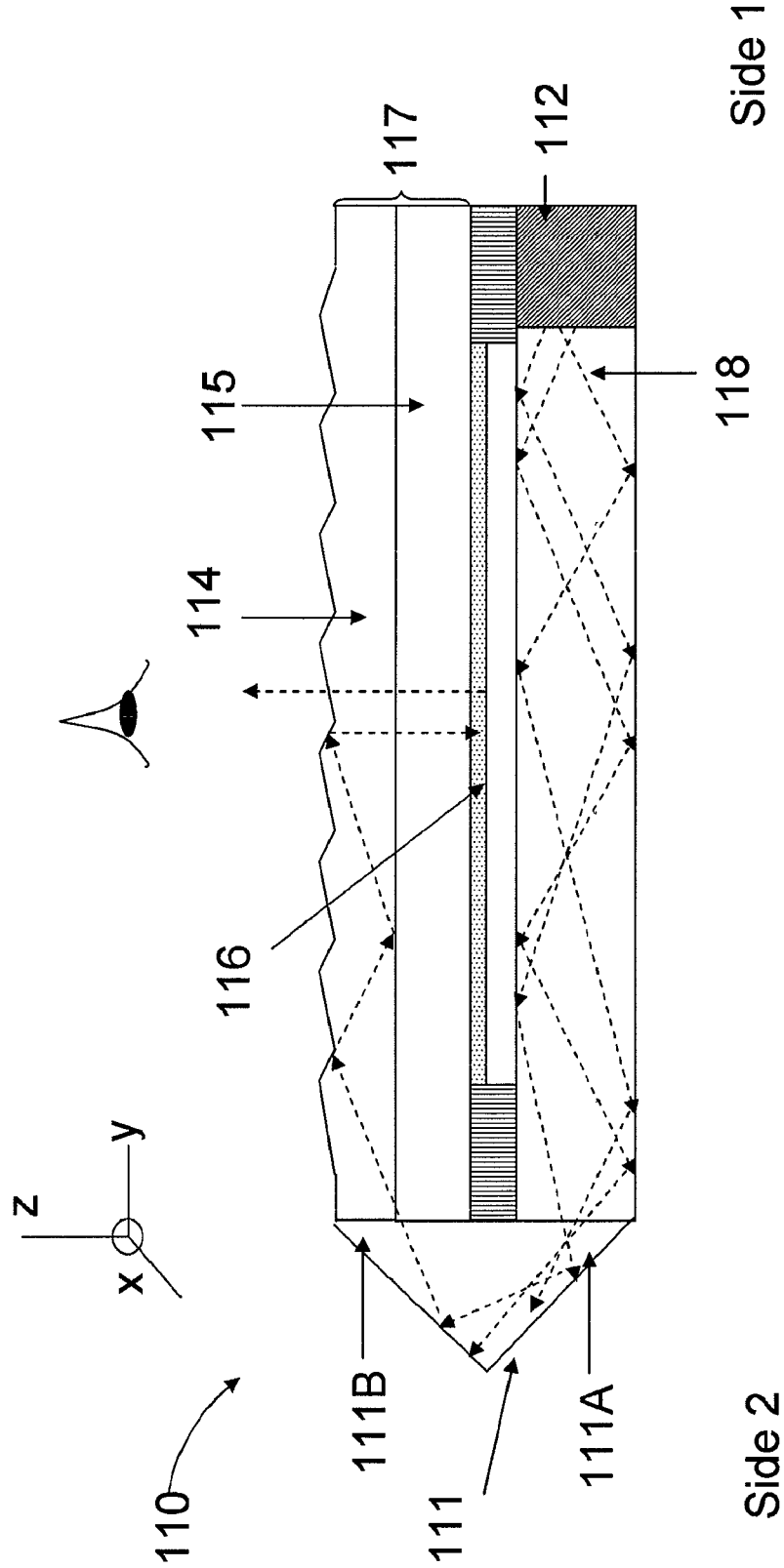
FIG. 11 is a cross section of a portion of an embodiment of a display device comprising of a turning mirror having two planar reflective surfaces angled with respect to each other.

In certain embodiments, the turning mirror may comprise multiple planar reflecting surfaces disposed at an angle with respect to each other. The particular embodiment illustrated in FIG. 11, for example, shows two reflecting planar surfaces angled with respect to each other. The angle between the two planar surfaces can vary between, for example, 90 and 120 degrees or between 90 and 100 degrees or between 90 and 110 degrees. In certain embodiments, the planar mirror surfaces are oriented at an angle of 90, 95 100, 105, 110, 115 or 120 degrees with respect to each other. Examples include 97 and 117 degrees. The angles are not limited to those of these particular examples or ranges. The turning mirror described in FIG. 11 comprises a solid rod or be it may be hollowed out as described above. The turning mirror may comprise optically transmissive material such as glass, plastic. In other embodiments, the mirror may be metal. In some other embodiments, the reflecting surface can comprise a metal film or a dielectric film. In some embodiments the reflecting film comprises an interference coating. The two reflecting surfaces can be fused, adhered, or affixed together. In some embodiments, for example, the mirror may be formed by extruding or molding an elongate structure with the planar surfaces thereon. Other methods of forming the two reflecting surfaces may be used.

In operation, light from light source 112 is coupled into the second light guide 118. The light propagates within the second light guide 118 from the input edge side 1 to output edge side 2 by total internal reflection. The light rays from the second light guide 118 are incident on the first reflecting plane 111A of the planar turning mirror 111. After reflection, the light rays are incident on the second reflecting plane 111B. After being reflected by the second reflecting surface 111B, the light rays are incident on the input of the first light guide 117 on side 2. The turning film 114 further comprises a plurality of turning features for turning light guided in the light guide 117 such that the light is redirected towards the display elements 116. The redirected light passes through the guiding portion 117 substantially normal to the light guide 117 and the array of display elements 116 and is transmitted to the interferometric modulators 116 preferably at normal incidence or close thereto.

Figure 12:
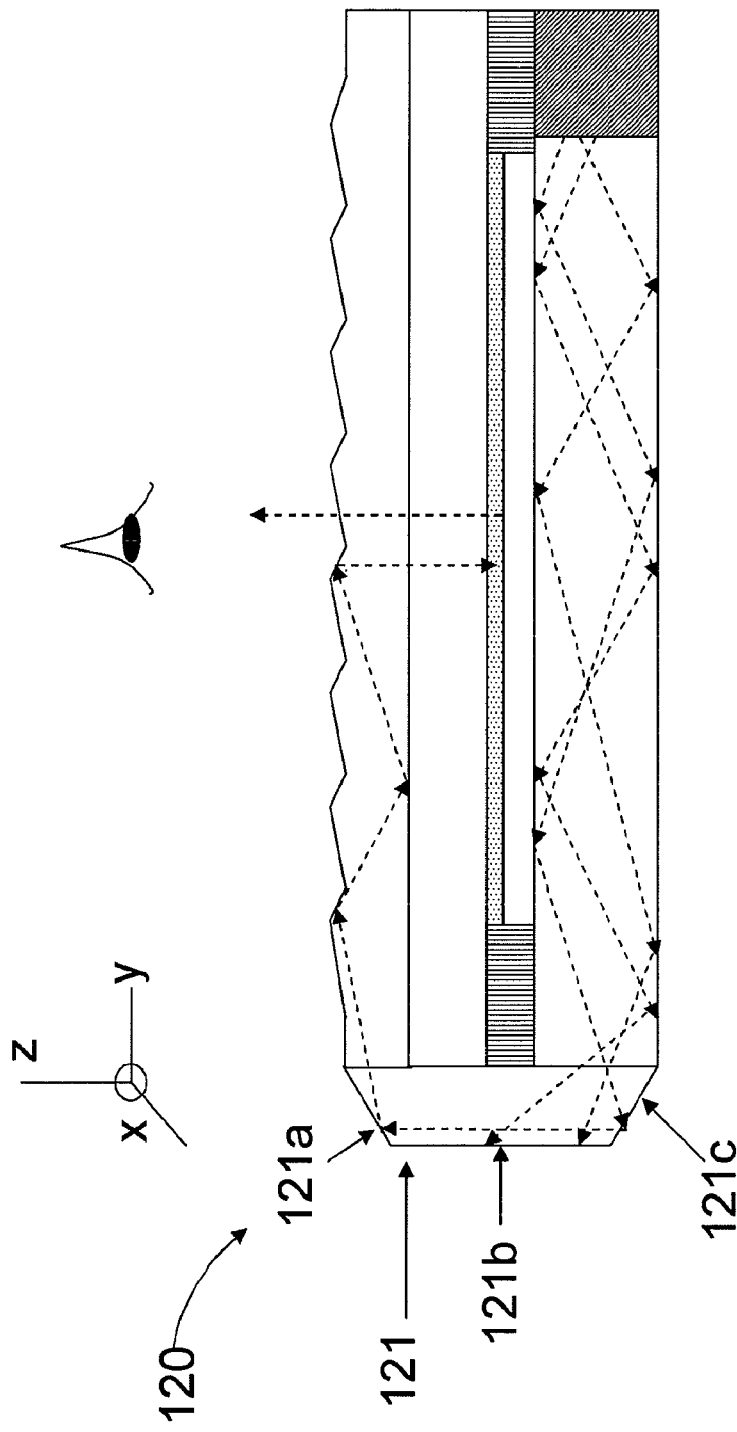
FIG. 12 is a cross section of a portion of another embodiment of a display device comprising of a turning mirror having three planar reflective surfaces angled with respect to each other.

In certain other embodiments, the turning mirror 121 may have a cross-section in the shape of a trapezoid as illustrated in FIG. 12. One advantage of a trapezoidal geometry for the turning mirror 121 is that the dimension of the turning mirror parallel to the y-axis can be reduced in comparison to the turning mirror 111 of FIG. 11. The trapezoidal turning mirror 121 is formed by three reflecting surfaces 121a, 121b and 121c. Reflecting surfaces 121a and 121c are angled with respect to reflecting surface 121b. The angular separation between reflecting surfaces 121a and 121b may be equal to the angle between reflecting surfaces 121b and 121c. The angle between the reflecting surfaces 121a and 121b may vary between 90 degrees and 151 degrees. The angle between the reflecting surfaces 121b and 121c may vary between 90 degrees and 151 degrees. In various embodiments, the angular separation between the reflecting surfaces 121a and 121b may be greater than 151 degrees. Similarly in various other embodiments the angular separation between the reflecting surfaces 121b and 121c may be greater than 151 degrees.

Figure 13:
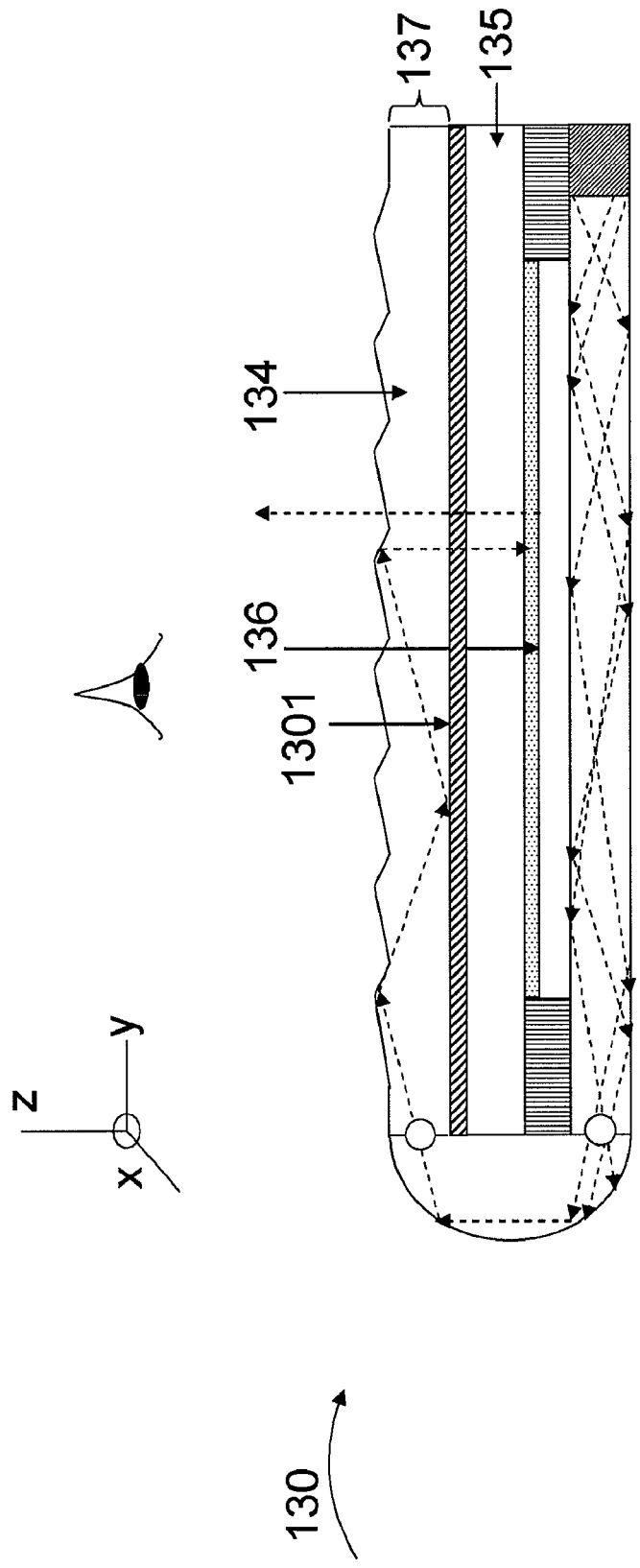
FIG. 13 is a cross section of a portion of another alternative embodiment of a display device wherein an isolation layer is disposed between the front light guide and the array of interferometric modulators.

In certain embodiments, the interferometric modulators may be absorptive to light rays traveling at an angle of 45-90 degrees measured from the normal to the interferometric modulators that are guided within the first light guide. Thus, some of the light propagating through first light guide may be substantially absorbed by the interferometric modulators after a sufficient number of reflections. An optical isolation layer may reduce, minimize, or prevent this loss of light due to absorption. A display device 130 comprising an optical isolation layer 1301 is illustrated in FIG. 13. The turning film 134 of display device 130 is separated from the substrate 135 on which a plurality of interferometric modulators 136 are formed by an optical isolation layer 1301. The display device 130 comprises from front to rear the second light guide 134, optical isolation layer 1301, the substrate 135 and the interferometric modulators 136. Intervening layers may also be included. In these embodiments, the front light guide 137 comprises the turning film 134. The optical isolation layer 1301 advantageously has an index of refraction substantially lower than the glass substrate 135, such that light traveling through the first light guide 137 and striking the glass/optical isolation film interface at an oblique or grazing angle, for example, greater than the critical angle (e.g., greater than 40° or 50° as measured with respect to the normal), will be totally internally reflected back into the first light guide 137 of the illumination apparatus 130. However, light propagating through the first light guide 137 at steep angles (closer to the normal to the array of display elements 136), such as light turned substantially normal to the first light guide 137 by the turning film 134 will be transmitted through the glass/optical isolation film interface. This normally incident light or near normally incident light preferably loses less than about 0.5% of its intensity, and more preferably loses less than about 0.1% of its intensity. Thus the optical isolation layer 1201 forms a boundary for the first light guide 137 such that the light propagating through the first light guide 137 at oblique or grazing angles prior to being turned by the turning film 134 may reflect back into, and continue to propagate through the first light guide 137 until it is turned toward the interferometric modulators 136 by the turning features at near normal incidence, thereby providing an increasingly illuminated display device.

Figure 14:
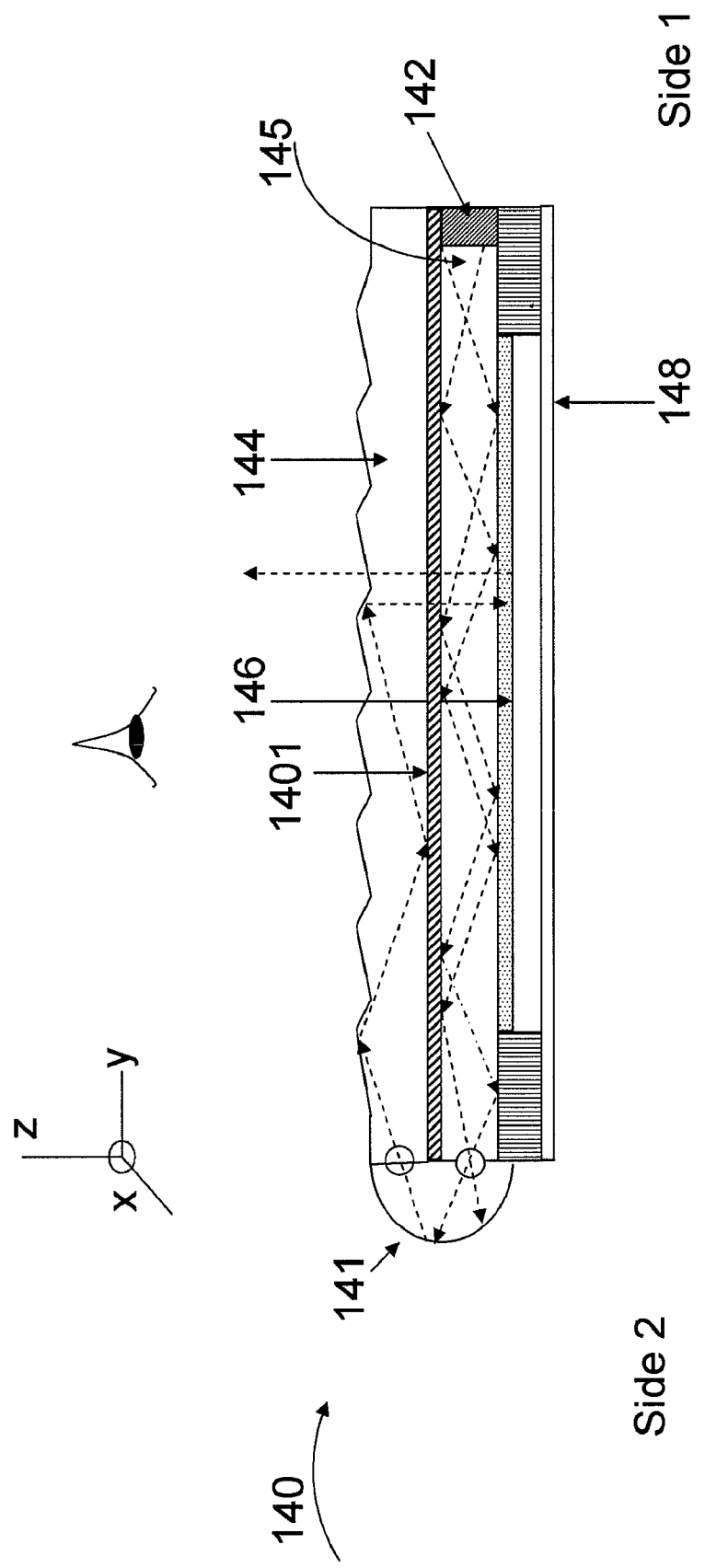
FIG. 14 is a cross section of a portion of an embodiment of a display device wherein the substrate on which the array of interferometric modulators are formed is used as a light guide.

In certain other embodiments, wherein the turning film 144 is separated from the substrate 145 by an optical isolation layer 1401, the substrate 145 on which a plurality of interferometric modulators 146 are formed may be used as the second light guide as illustrated in FIG. 14. The display device 140 comprises from front to rear the turning film 144, optical isolation layer 1401, the substrate 145, the interferometric modulators 146 and the backplate 148. Intervening layers may also be included. A light source 142 is disposed to one side of the substrate 145, for example, side 1. The substrate 145 functions as the second light guide and guides light from the source 142 on side 1 to the turning mirror 141 on side 2. This configuration may be particularly advantageous in reducing the overall thickness of the display device 140.

Figure 15:
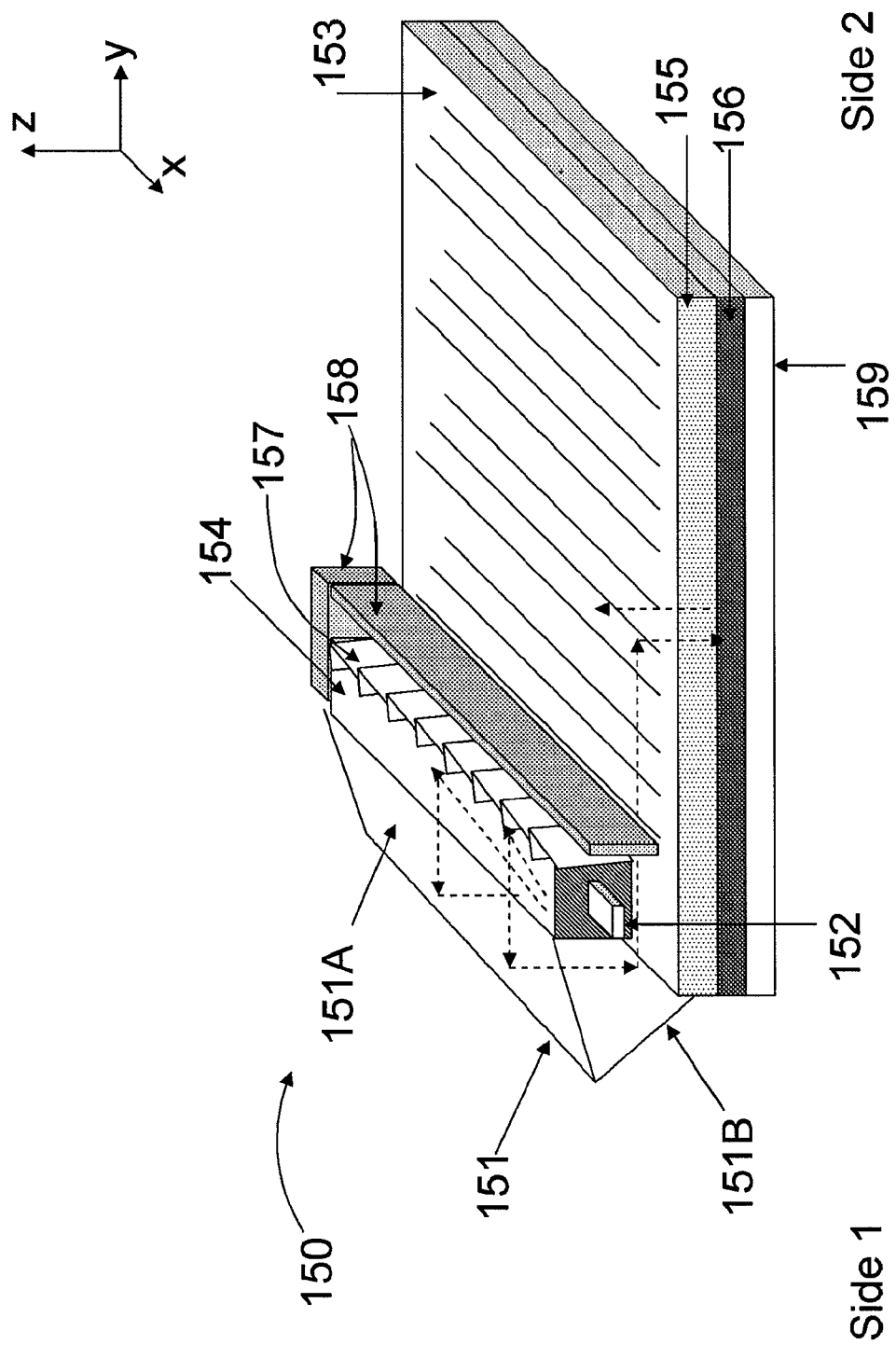
FIG. 15 is a perspective view of an embodiment of a display device comprising a light bar disposed on the light guide panel and a turning mirror configured to couple light from the light bar into the light guide panel.

In various embodiments, the second light guide may be replaced with a light bar. The turning mirror may be used to couple light from the light bar to an edge of the front light guide panel. FIG. 15 illustrates a perspective view of a particular embodiment of a display device 150 comprising of a LED 152, a light bar 154, a turning mirror 151, a light guide panel 155 and a turning film 153. The display device 150 comprises of a reflective display comprising a plurality of reflective elements 156 such as reflective spatial light modulators. A light guide panel 155 is forward of the plurality of reflective elements 156. The light guide panel 155 includes a turning film 153 comprising, for example, a prismatic film. Other methods of forming the turning film 153 and attaching it to the light guide panel 155 such as are described herein may be used as well. As discussed above, the turning film directs light propagating through the light guide panel 155 onto the display elements 156. Light reflected from the display elements 156 then transmitted out of the light guide panel 155 towards the viewer. This design is particularly advantageous in reducing the dimension in the X-Y plane.

In the device shown in FIG. 15, a light source 152 is disposed forward of the light guide panel 155 and the array of display elements 156. The light source 152 is configured so that the direction of emission is parallel to the negative x axis. The light source 152 may comprise an LED. The light bar 154 is disposed with respect to the light source 152 to receive light into the end proximal to the light source 152. The light bar 154 comprises substantially optically transmissive material that supports propagation of light along the length of the light bar 154. Light emitted from the light emitter 152 propagates into the light bar 154 parallel to negative x-axis and is guided therein, for example, via total internal reflection at sidewalls thereof which form interfaces with air or some other surrounding medium. Accordingly, light travels from the end proximal to the light source 152 to a second end distal to the light source 152 of the light bar 154. Reflective sections 158 may be disposed with respect to the side and end of the light bar 154 as shown. Reflectors may also be included above and/or below the light bar 154. The light bar 154 is disposed on a first side (side 1) of the light guide panel 155 and array of display elements 156.

The light bar 154 includes a turning microstructure on one sidewall closer to side 2 in FIG. 15. The light bar 154 is disposed on a first side (side 1) of the light guide panel 155 and array of display elements 156. The turning microstructure is configured to turn at least a substantial portion of the light incident on that side wall of the light bar 154 and to direct a portion of light out of the light bar 154 toward side 1 (in the negative y-direction).

The turning microstructure of the light bar 154 comprises a plurality of turning features. The turning features may comprise triangular facets as shown in FIG. 15. The features shown in FIG. 15 are schematic, not to scale and exaggerated in size and spacing there between. In some embodiments, some or all of the faceted features of the turning microstructure could be formed in a film that is formed on, or laminated to, the light bar 154. In other embodiments, the light bar 154 is formed by molding and the facets are formed in this molding process. The facets or sloping surfaces of the turning features are configured to scatter light out of the light bar 154 along the negative y-axis. Light may, for example, reflect by total internal reflection from a portion of the sidewall of the light bar parallel to the length of the light bar to one of the sloping surfaces. This light may reflect from the sloping surface in a direction out of the light bar 154 toward side 1 of the display in the negative y-direction.

A turning mirror 151 is disposed to receive light propagating in the negative y-direction out of the light bar 154 and turn toward side 1 in the opposite direct (e.g., about by 180 degrees) to propagate along the positive y-direction into the light guide panel 155 toward side 2 of the display. The turning mirror 151 redirects the light by reflection. FIG. 15 illustrates a particular embodiment of a turning mirror 151, formed by two planar reflecting surfaces 151A and 151B disposed at an angle with each other. Alternate embodiments of the turning mirror such as described above may also be used. As described herein, configurations are provided that can produce reduced footprint. Various embodiments employ a turning mirror to accomplish the reduced size. Not all the embodiments need to use a turning mirror or need to produce reduce footprint.

A wide variety of other variations are also possible. Films, layers, components, and/or elements may be added, removed, or rearranged. Additionally, processing steps may be added, removed, or reordered. Also, although the terms film and layer have been used herein, such terms as used herein include film stacks and multilayers. Such film stacks and multilayers may be adhered to other structures using adhesive or may be formed on other structures using deposition or in other manners.

The examples described above are merely exemplary and those skilled in the art may now make numerous uses of, and departures from, the above-described examples without departing from the inventive concepts disclosed herein. Various modifications to these examples may be readily apparent to those skilled in the art, and the generic principles defined herein may be applied to other examples, without departing from the spirit or scope of the novel aspects described herein. Thus, the scope of the disclosure is not intended to be limited to the examples shown herein but is to be accorded the widest scope consistent with the principles and novel features disclosed herein. The word "exemplary" is used exclusively herein to mean "serving as an example, instance, or illustration." Any example described herein as "exemplary" is not necessarily to be construed as preferred or advantageous over other examples.

What is claimed is:

1. A display device comprising:
   a reflective spatial light modulator included in a pixel of a display;
   a light source rearward of said reflective spatial light modulator;
   a first light guide forward of said reflective spatial light modulator, said first light guide having forward and rearward surfaces;
   a second light guide rearward of said reflective spatial light modulator such that light from said light source propagates therein; and
   a turning mirror disposed to receive light from an edge of the second light guide that is distal to the light source and direct said light into said first light guide, such that said light is total internally reflected from the forward and rearward surfaces of the first light guide so as to be guided along the length of the first light guide,
   wherein said first light guide is configured to direct said light coupled therein to said reflective spatial light modulator.

2. The display device of claim 1, wherein said reflective spatial light modulator comprises an electromechanical system.

3. The display device of claim 1, wherein said reflective spatial light modulator comprises a plurality of interferometric modulators.

4. The display device of claim 1, wherein said reflective spatial light modulator comprises a substrate on which a plurality of modulating elements is formed.

5. The display device of claim 1, wherein said light source comprises a light emitting diode.

6. The display device of claim 1, wherein said light source comprises a light bar having two ends, two sides, and a top and bottom, said top and bottom and sides disposed between said ends, wherein light injected into one end of the light bar propagates toward the other end and is deflected so as to exit a side of said light bar into said second light guide, said ends being small in area compared to said sides.

7. The display device of claim 4, wherein said first light guide is said substrate on which said plurality of modulating elements are formed.

8. The display device of claim 4, wherein said first light guide comprises a sheet, plate, film, or film stack or combination thereof disposed forward said substrate.

9. The display device of claim 8, further comprising an isolation layer between said first light guide and said substrate.

10. The display device of claim 1, further comprising turning features disposed on or in said first light guide to turn said light propagating therein onto said reflective spatial light modulator.

11. The display device of claim 10, wherein said turning features comprise a reflective, refractive, holographic or diffractive optical element.

12. The display device of claim 1, wherein said second light guide is a backplate for said reflective spatial light modulator.

13. The display device of claim 1, wherein said second light guide comprises an existing backlight for said reflective spatial light modulator.

14. The display device of claim 4, wherein said second light guide is said substrate on which said plurality of modulating elements are formed.

15. The display device of claim 14, wherein said second light guide comprises a sheet, plate, film, film stack, or combination thereof.

16. The display device of claim 4, further comprising an isolation layer disposed between said first light guide and said substrate.

17. The display device of claim 1, wherein said turning mirror comprises a curved reflective surface.

18. The display device of claim 17, wherein said curved reflective surface is elliptical.

19. The display device of claim 18, wherein said elliptical surface has foci proximal to ends of said first light guide and said second light guide such that said light from said light source passes though said second light guide to said turning mirror and into said first light guide.

20. The display device of claim 1, wherein said turning mirror comprises a plurality of planar mirror surfaces oriented at an angle with respect to each other.

21. The display device of claim 20, wherein said angle is between about 90 and 120 degrees.

22. The display device of claim 20, wherein said angle is about 90 degrees.

23. The display device of claim 20, wherein said angle is about 120 degrees.

24. The display device of claim 1, wherein said turning mirror comprises a metalized surface.

25. The display device of claim 1, wherein said turning mirror comprises a reflective dielectric stack.

26. The display device of claim 1, further comprising:
   a processor that is configured to communicate with said spatial light modulator, said processor being configured to process image data; and
   a memory device that is configured to communicate with said processor.

27. The display device of claim 26, further comprising a driver circuit configured to send at least one signal to said spatial light modulator.

28. The display device of claim 27, further comprising a controller configured to send at least a portion of the image data to said driver circuit.

29. The display device of claim 26, further comprising an image source module configured to send said image data to said processor.

30. The display device of claim 29, wherein the image source module comprises at least one of a receiver, transceiver, and transmitter.

31. The display device of claim 26, further comprising an input device configured to receive input data and to communicate said input data to said processor.

32. A display device comprising:
    a means for reflectively modulating light for forming part of an image;
    a means for illuminating disposed rearward of said reflectively light modulating means;
    a first means for guiding light forward of said reflectively light modulating means, said first means for guiding light having forward and rearward surfaces;
    a second means for guiding light rearward of said reflectively light modulating means such that light from said light illuminating means propagates therein; and
    a turning mirror disposed to receive light from an edge of said second light guiding means that is distal to said illuminating means and direct said light into said first light guiding means, such that said light is total internally reflected from the forward and rearward surfaces of the first means for guiding light so as to be guided along the length of the first means for guiding light,
    wherein said first light guiding means is configured to direct said light coupled therein to said reflectively light modulating means.

33. A method of manufacturing a display device, the method comprising:
    providing a reflective spatial light modulator included in a pixel of a display;
    disposing a light source rearward of said reflective spatial light modulator;
    disposing a first light guide forward of said reflective spatial light modulator, said first light guide having forward and rearward surfaces;
    disposing a second light guide rearward of said reflective spatial light modulator such that light from said light source propagates therein; and
    disposing a turning mirror to receive light from an edge of the second light guide that is distal to the light source and direct said light into said first light guide, such that said light is total internally reflected from the forward and rearward surfaces of the first light guide so as to be guided along the length of the first light guide.

34. The display device of claim 1, wherein said light source comprises a light bar having two ends and a plurality of sides disposed between said ends, said light source further comprising a light emitter disposed with respect to said light bar to injected light into one end of the light bar, said light propagating toward the other end and being deflected so as to exit a side of said light bar into said second light guide.

* * * * *

UNITED STATES PATENT AND TRADEMARK OFFICE
CERTIFICATE OF CORRECTION

| | |
|---|---|
| PATENT NO. | : 7,949,213 B2 |
| APPLICATION NO. | : 11/952872 |
| DATED | : May 24, 2011 |
| INVENTOR(S) | : Mienko et al. |

It is certified that error appears in the above-identified patent and that said Letters Patent is hereby corrected as shown below:

On the Title Page at Item (56), Page 4, Col. 2, Line 16, under Other Publications change "Rosonator" to --Resonator--.

At Column 20, Line 31, in Claim 19, change "though" to --through--.

Signed and Sealed this
First Day of November, 2011

David J. Kappos
*Director of the United States Patent and Trademark Office*